United States Patent
Agiwal et al.

(10) Patent No.: US 10,306,470 B2
(45) Date of Patent: May 28, 2019

(54) SYSTEM AND METHOD FOR VALIDATING AUTHENTICITY OF BASE STATION AND/OR INFORMATION RECEIVED FROM BASE STATION

(71) Applicant: Samsung Electronics Co., Ltd., Suwon-si, Gyeonggi-do (KR)

(72) Inventors: Anil Agiwal, Suwon-si (KR); Rajavelsamy Rajadurai, Bangalore (IN); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/480,847

(22) Filed: Apr. 6, 2017

(65) Prior Publication Data

US 2017/0295489 A1    Oct. 12, 2017

Related U.S. Application Data

(60) Provisional application No. 62/318,924, filed on Apr. 6, 2016.

(51) Int. Cl.
*H04W 12/06* (2009.01)
*H04W 4/70* (2018.01)
(Continued)

(52) U.S. Cl.
CPC .............. *H04W 12/06* (2013.01); *H04W 4/70* (2018.02); *H04W 12/04* (2013.01); *H04W 12/10* (2013.01);
(Continued)

(58) Field of Classification Search
None
See application file for complete search history.

(56) References Cited

U.S. PATENT DOCUMENTS

| | | | |
|---|---|---|---|
| 7,885,639 B1 * | 2/2011 | Satish | H04L 9/32 455/410 |
| 9,668,129 B2 * | 5/2017 | Bone | H04L 63/0853 |

(Continued)

FOREIGN PATENT DOCUMENTS

WO    2015/000158 A1    1/2015

OTHER PUBLICATIONS

International Search Report dated Jul. 26, 2017, issued in the International Application No. PCT/KR2017/003774.

*Primary Examiner* — German Viana Di Prisco
(74) *Attorney, Agent, or Firm* — Jefferson IP Law, LLP

(57) ABSTRACT

A communication method and a system for converging a $5^{th}$-Generation (5G) communication system for supporting higher data rates beyond a $4^{th}$-Generation (4G) system with a technology for internet of things (IoT) are provided. The present disclosure may be applied to intelligent services based on the 5G communication technology and the IoT-related technology, such as smart home, smart building, smart city, smart car, connected car, health care, digital education, smart retail, security and safety services. A system and a method for validating authenticity of a base station and/or information received from the base station are provided. The method for determining authenticity of system information received from a base station and a cell operated by the base station includes receiving, from a base station, system information, receiving, from a base station, system information, receiving, from the base station, first authenticity information associated with the system information, determining whether the system information is authentic based on the first authenticity information, and determining that a cell operated by the base station is authentic if the system information is authentic.

20 Claims, 34 Drawing Sheets

(51) Int. Cl.
  *H04W 12/04*   (2009.01)
  *H04W 12/10*   (2009.01)
  H04W 84/04    (2009.01)
  H04W 88/08    (2009.01)
  H04W 48/16    (2009.01)

(52) U.S. Cl.
  CPC .......... *H04W 48/16* (2013.01); *H04W 84/042* (2013.01); *H04W 88/08* (2013.01)

(56) References Cited

U.S. PATENT DOCUMENTS

| | | |
|---|---|---|
| 2009/0104889 A1 | 4/2009 | Lotvonen et al. |
| 2011/0208866 A1 | 8/2011 | Marmolejo-Meillon et al. |
| 2012/0189016 A1* | 7/2012 | Bakker ................ H04W 76/11 370/401 |
| 2014/0304770 A1 | 10/2014 | Jung |
| 2015/0124708 A1* | 5/2015 | Blankenship ......... H04W 12/08 370/329 |
| 2015/0271194 A1* | 9/2015 | Szucs ................ H04L 63/0869 726/23 |
| 2015/0351014 A1* | 12/2015 | Jung .................... H04W 48/18 370/338 |
| 2016/0149935 A1 | 5/2016 | Liu et al. |
| 2016/0205550 A1* | 7/2016 | Rajadurai ............... H04W 4/90 455/411 |
| 2016/0255064 A1* | 9/2016 | Naslund ............... G06F 21/602 726/3 |
| 2017/0126411 A1* | 5/2017 | Piqueras Jover ..... H04L 9/3247 |
| 2018/0084560 A1* | 3/2018 | Cho ...................... H04W 12/08 |
| 2018/0124601 A1* | 5/2018 | Vutukuri ............... H04W 48/14 |
| 2018/0367303 A1* | 12/2018 | Velev ........................ H04L 9/30 |

* cited by examiner

FIG. 4
 Message with DS periodically transmitted. Period can be SFN cycle or longer

SYSTEM AND METHOD FOR VALIDATING AUTHENTICITY OF BASE STATION AND/OR INFORMATION RECEIVED FROM BASE STATION

CROSS-REFERENCE TO RELATED APPLICATION(S)

This application claims the benefit under 35 U.S.C. § 119(e) of a U.S. Provisional application filed on Apr. 6, 2016 in the U.S. Patent and Trademark Office and assigned Ser. No. 62/318,924, the entire disclosure of which is hereby incorporated by reference.

TECHNICAL FIELD

The present disclosure relates to a broadband wireless technology in a wireless communication system. More particularly, the present disclosure relates to a system and a method for authenticity of a base station and/or information received from the base station.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

Meanwhile, in the recent years, several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. A fifth generation wireless communication system is being developed to meet the growing demand for high speed data services, support ultra-reliability and low latency applications and support massive machine type communication.

In the legacy system, a user equipment (UE) which is in coverage of network can be in radio resource control (RRC) Idle state or in RRC Inactive state or RRC connected state. In RRC connected state, UE is connected with base station and securely communicates with the base station. In RRC inactive state also, the UE securely communicates with the base station. In RRC idle state, UE is camped on a cell, i.e., UE has completed the cell selection/reselection process and has chosen a cell. The UE performs the following basic operations: monitoring a Paging channel to detect incoming calls, system information (SI) change, and if earthquake and tsunami warning service (ETWS) capable, ETWS notification; performing neighboring cell measurements and cell (re-)selection; and acquiring SI.

Additionally, the UE may obtain the following services in RRC idle state and inactive state.

- The UE interested in sidelink discovery transmission can acquire the system information block (SIB) 19 and use the transmission resources configured via SIB 19 for sidelink discovery transmission. SIB 19 configures both intra frequency and inter frequency (intra public land mobile network (PLMN) as wells as inter PLMN) transmission resources.
- The UE interested in sidelink discovery reception can acquire the SIB 19 and use the reception resources configured via SIB 19 for sidelink discovery reception. The SIB 19 configures both intra frequency and inter frequency (intra PLMN as wells as inter PLMN) reception resources.
- The UE interested in multimedia broadcast multicast services (MBMS) reception can acquire SIB 13 and use the control information indicated in SIB 13 for MBMS reception.
- The UE interested in sidelink communication transmission can acquire the SIB 18 and use the transmission resources configured via SIB 18 for sidelink communication transmission.
- The UE interested in sidelink communication reception can acquire the SIB 18 and use the reception resources configured via SIB 18 for sidelink communication reception.
- The UE interested in vehicle-to-vehicle (V2V) communication transmission can acquire the relevant SIBs and use the transmission resources configured via the relevant SIBs for V2V communication transmission.
- The UE interested in V2V communication reception can acquire the relevant SIBs and use the reception resources configured via the relevant SIBs for V2V communication reception.

In order for UE to obtain the desired service from the camped cell, UE should be able to validate that SI received by UE is authentic and/or cell/base station (BS) from which the UE has received SI is authentic (i.e., the BS is genuine). If UE cannot validate, then,

- the UE uses the incorrect configuration received in SIBs leading to service denial. For example, the transmission/reception resource configuration received in SIB 18/19 can be incorrect, and UE may think that camped cell supports sidelink leading to UE transmitting and receiving sidelink transmission/reception incorrectly.
- the UE uses the incorrect resource configuration received in SIBs leading to interference. For example, the inter frequency/PLMN transmission resource configuration received in SIB 18/19 can be incorrect, and UE may transmit using these resources leading to interference in neighbor cells as these resources are not reserved for D2D in neighbor cells.

the UE may not be able to receive paging. The camped cell may be fake and may not be connected to core network.

In legacy system, UE camps to a cell if cell belongs to selected/registered/equivalent PLMN, cell selection-criterion (S-criterion) is met and cell is not barred and belongs to non-forbidden tracking area. If the SI broadcasted is not securely transmitted, UE cannot validate whether the broadcasted SI received by UE is authentic or not (in other words, whether the camped cell is authentic cell). UE is also not able to validate whether cell or BS is authentic or not. Note that in legacy system, UE and network validates each other's authenticity when UE registers or attaches with network. Network can revalidate authenticity of the UE as and when needed. UE and BS validate each other's authenticity when UE establishes connection with the BS. However in RRC idle state, UE may move from one cell to another, but no mechanisms are defined to authenticate the camped cell or authenticate the information received from camped cell.

A system and method to authenticate the cell/BS and/or authenticate the information received from the cell/BS in idle state is needed.

Note that terms 'cell' and 'BS' are used interchangeably in the description. Also, the BS can be an evolved node B (eNB) or a g node B (gNB).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system and a method for validating authenticity of a base station and/or information received from the base station.

In accordance with an aspect of the present disclosure, a method of a user equipment for determining authenticity of system information received from a base station and a cell operated by the base station is provided. The method includes receiving, from a base station, system information, receiving, from the base station, first authenticity information associated with the system information, determining whether the system information is authentic based on the first authenticity information, and determining that a cell operated by the base station is authentic if the system information is authentic.

In accordance with another aspect of the present disclosure, a method of a base station for transmitting system information is provided. The method includes generating authenticity information associated with system information, transmitting, to a user equipment, the system information, and transmitting, to the user equipment, the authenticity information.

In accordance with another aspect of the present disclosure, a user equipment in a wireless communication system is provided. The user equipment includes a receiver configured to: receive, from a base station, system information, and receive, from the base station, first authenticity information associated with the system information, and a processor configured to: determine whether the system information is authentic based on the first authenticity information, and determine that a cell operated by the base station is authentic if the system information is authentic.

In accordance with another aspect of the present disclosure, a base station in a wireless communication system is provided. The base station includes a processor configured to generate authenticity information associated with system information; and a transmitter configured to: transmit, to a user equipment, the system information, and transmit, to the user equipment, the authenticity information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 shows an example where a message with MAC/DS is periodically transmitted according to an embodiment of the present disclosure;

Throughout the drawings, like reference numerals will be understood to refer to like parts, components, and structures.

DETAILED DESCRIPTION

Figure 1:
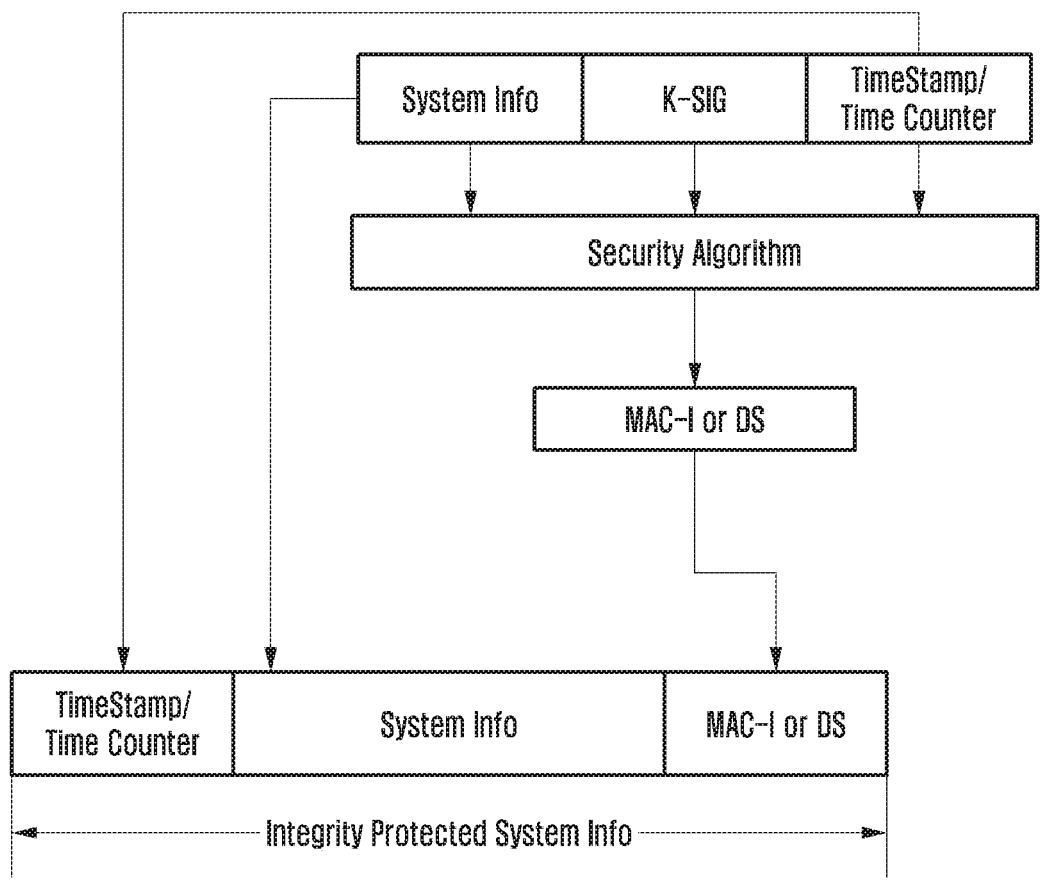
FIG. 1 illustrates a transmitter (or base station (BS)) operation in Proposed Method 1 according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out steps of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Proposed Method 1: Integrity Protection of System Information (SI):

In this method, SI is integrity protected. The security key (K-SIG) used for integrity protection can be symmetric key or asymmetric key. If the symmetric key is used for integrity protection then message authentication code (MAC) is generated using the security algorithm known in the prior art. If the asymmetric key is used for integrity protection then digital signature (DS) is generated using the security algorithm known in the prior art.

Transmitter (or base station (BS)) Operation: FIG. 1 illustrates a transmitter (or BS) operation in Proposed Method 1 according to an embodiment of the present disclosure. The SI (or signaling message carrying SI) to be protected, security key (K-SIG) and time stamp/time counter of the time slot in which SI (or signaling message carrying SI) will be transmitted, are input to security algorithm to generate MAC or DS as shown in FIG. 1. Note that K-SIG used by transmitter is the private key if the asymmetric security key is used for integrity protection. If the time stamp is used, then time stamp comprises at least one of Year, Month, Date, Hour, Minute, Second (mille second or micro second) and Time Zone corresponding to time slot (e.g., transmission time interval (TTI), subframe, slot, mini slot, etc.) in which SI will be transmitted. If the time counter is used, then time counter can be coordinated universal time (UTC) (in unit of secs or minutes or any other unit) corresponding to time slot in which SI (or signaling message carrying SI) will be transmitted. Additional parameters such as security algorithm distinguisher, flow identifier (ID) or radio bearer ID, length, sequence number (SN), etc. may also be input to security algorithm to generate MAC or DS. The transmitter then transmits (broadcasts) the SI (or signaling message carrying SI) and generated MAC or DS. In one embodiment, time stamp/time counter value used to generate MAC or DS can also be transmitted along with MAC or DS. In another embodiment, instead of full time stamp/time counter, some least significant bits (LSBs) of time stamp/time counter value used to generate MAC or DS can be transmitted along with MAC or DS. Note that additional info may be included during protocol data unit (PDU) formation by various layers such as (packet data convergence protocol (PDCP)/radio link control (RLC)/MAC).

Receiver (or user equipment (UE)) Operation: On receiving the SI (or signaling message carrying SI), UE determines the time stamp/time counter corresponding to the time slot in which SI (or signaling message carrying SI) is received.

In an embodiment wherein full time stamp/time counter is transmitted by the transmitter, the time stamp/time counter corresponding to the time slot in which SI (or signaling message carrying SI) is received has the time stamp/time counter value received from transmitter.

In another embodiment, wherein partial time stamp/time counter is transmitted by the transmitter, the time stamp/time counter corresponding to the time slot in which SI (or signaling message carrying SI) is received is determined using the time stamp/time counter maintained by UE and partial time stamp/time counter value received from transmitter. In one method in which 'x' LSBs of time stamp/time counter are received from transmitter, receiver replace the 'x' LSBs of time stamp/time counter at the receiver corresponding to the time slot in which SI (or signaling message carrying SI) is received, by the 'x' LSBs of time stamp/time counter received. Alternately, the time stamp/time counter value with 'x' LSBs equal to 'x' LSBs received from the transmitter and nearest to the time stamp/time counter value in the receiving UE corresponding to the time slot in which SI (or signaling message carrying SI) is received is used as the time stamp/time counter value of time slot in which SI (or signaling message carrying SI) is received.

In another embodiment, wherein time stamp/time counter is not transmitted by the transmitter, the time stamp/time counter corresponding to the time slot in which SI (or signaling message carrying SI) is received is equal to the time stamp/time counter value in the receiver corresponding to the time slot.

If the full time stamp/time counter is received from the transmitter and if difference between received timestamp/time counter and time stamp/counter in UE for time slot in which SI (or signaling message carrying SI) is received is above a threshold (threshold can be pre-defined or signaled to UE by the network), UE considers the SI as not authentic. If the partial time stamp/time counter is received from the transmitter and if difference between determined timestamp/time counter as described above and time stamp/counter in UE for time slot in which SI (or signaling message carrying SI) is received is above a threshold, UE considers the SI as not authentic.

The SI received, security key (K-SIG) and time stamp/time counter of the time slot in which SI is received are input to security algorithm to generate MAC or DS. Additional parameters such as FC, flow ID or radio bearer ID, length, SN etc. may also be input to security algorithm to generate MAC or DS. Note that K-SIG used by receiver is the public key if the asymmetric security key is used for integrity protection. UE then checks if the received MAC or DS is same as generated MAC or DS or not. If yes, then SI is authentic and UE can use it. If no, then SI is not authentic and UE discards it.

Figure 2A:
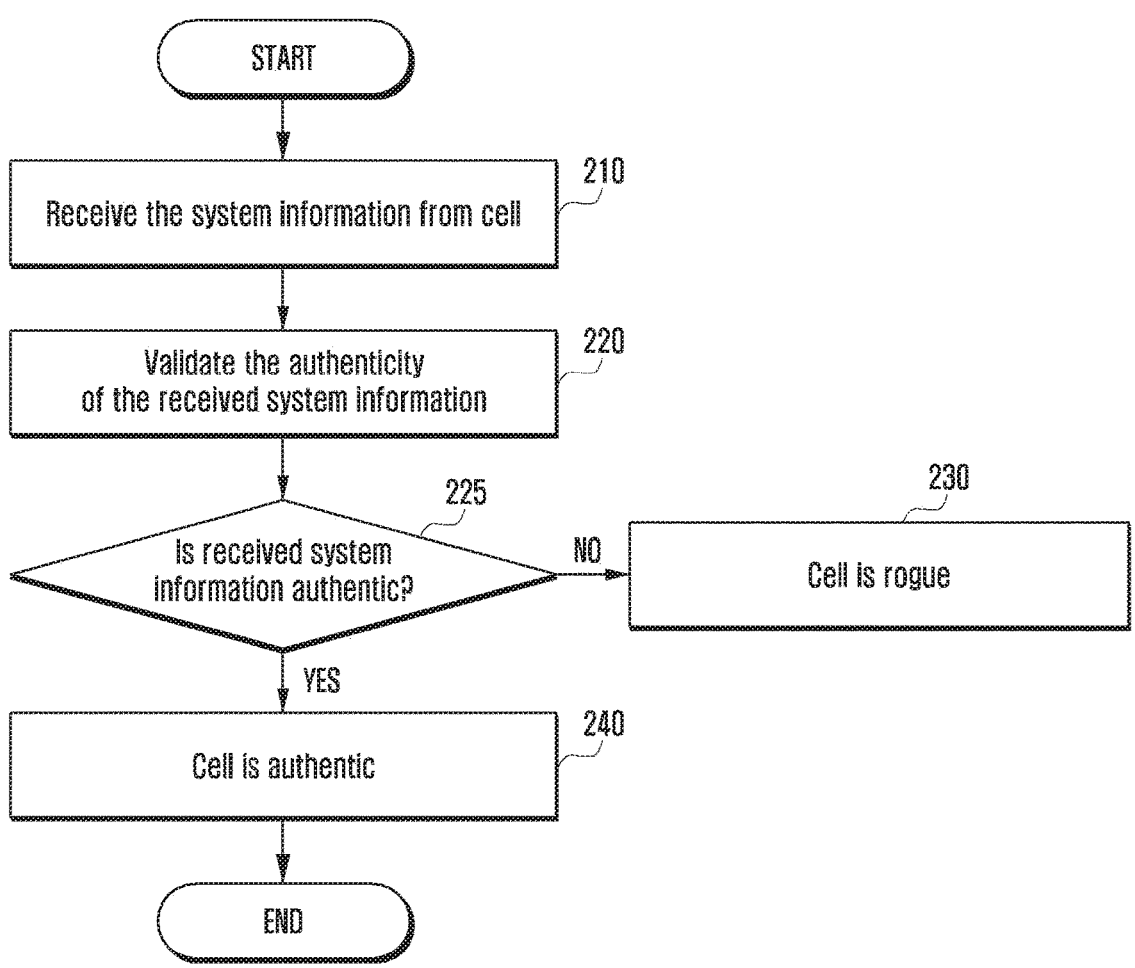
FIGS. 2A and 2B illustrate receiver (or user equipment (UE)) operation in Proposed Method 1 according to an embodiment of the present disclosure.
Figure 2B:
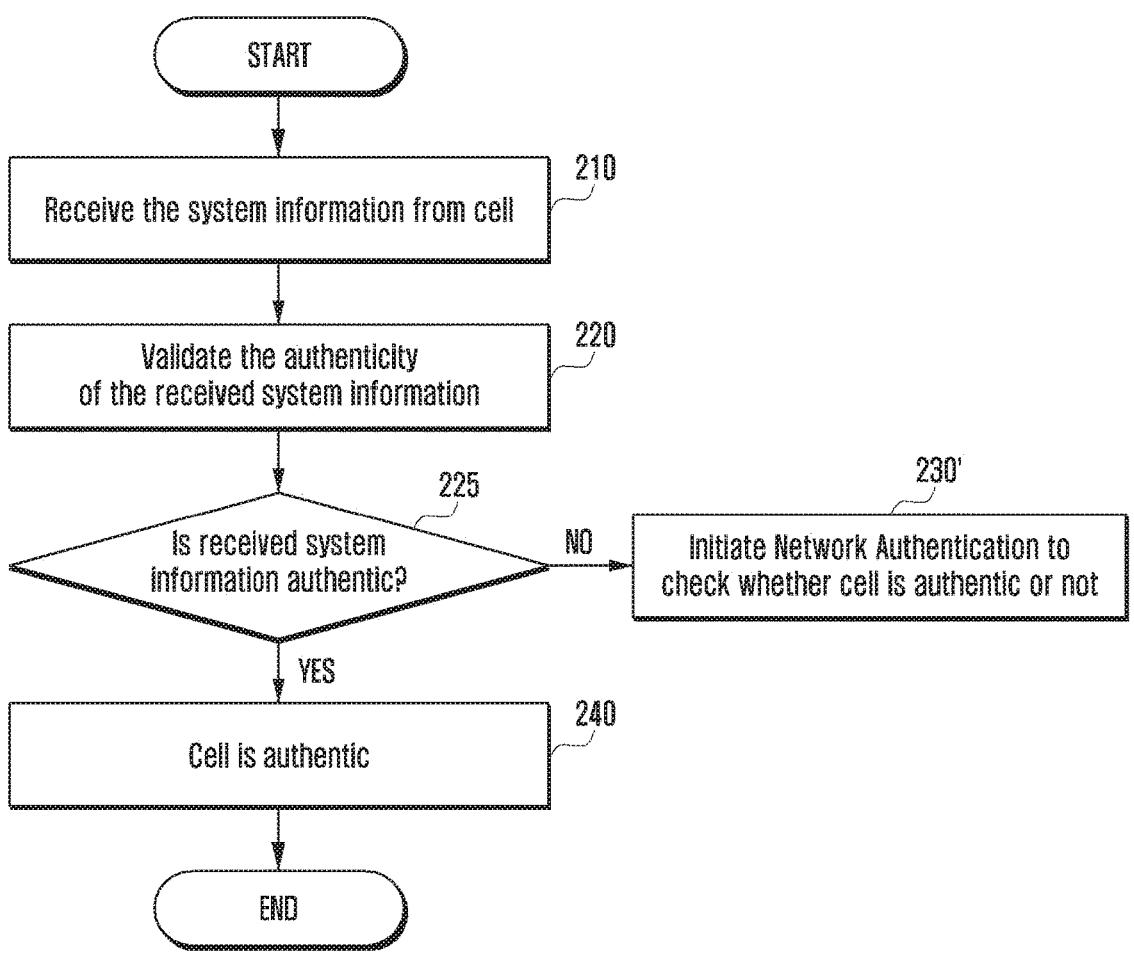

Determining Cell is rogue or genuine: FIGS. 2A and 2B illustrate receiver (or UE) operation in Proposed Method 1 according to an embodiment of the present disclosure.

In an embodiment, UE determines whether the cell is authentic or rogue as shown in FIG. 2A. In particular, UE receives the SI from the cell at operation 210. UE then validates the authenticity of the received SI at operation 220. In order to validate the authenticity of the received SI, UE generates the MAC/DS for the received SI using SI received, security key (K-SIG) and time stamp/time counter of the time slot in which SI is received as described above. The UE determines whether the cell is authentic or rogue in operation 225.

The SI is authentic if generated MAC/DS is same as the received MAC/DS for the SI.

The SI is not authentic if generated MAC/DS is not same as the received MAC/DS for the SI.

In an embodiment, SI is not authentic, if the full time stamp/time counter is received from the transmitter and if difference between received timestamp/time counter and time stamp/counter in UE for time slot in which SI (or signaling message carrying SI) is received is above a threshold (threshold can be pre-defined or signaled to UE by the network).

In an embodiment, SI is not authentic, if the partial time stamp/time counter is received from the transmitter and if difference between determined timestamp/time counter as described above and time stamp/counter in UE for time slot in which SI (or signaling message carrying SI) is received is above a threshold.

If the received SI from cell is not authentic, then UE considers this cell as rogue at operation 230, otherwise it considers the cell as authentic at operation 240. UE does not camp to this cell or if already camped it stops camping to this cell and reselects a new cell or triggers cell reselection. In another embodiment, if the integrity validation of received SI from a cell fails consecutively some fixed number of times, then UE can consider this cell as rogue. UE does not camp to this cell or if already camped on this cell it stops camping to this cell and reselects a new cell or triggers cell reselection.

In another embodiment, if the integrity validation of received SI from a cell fails, UE may initiate network authentication to check whether cell is authentic as shown in operation 230' of FIG. 2B, or the UE may move from radio resource control (RRC) idle/inactive state to Connected state. During the connection setup if mutual authentication is failed, UE can consider the cell as rogue. In an embodiment, the UE may consider the rogue cell as barred cell.

Security Key (K-SIG):

In an embodiment, the security key (K-SIG) is specific to PLMN.

In another embodiment, K-SIG is specific to cell and derived from another PLMN specific security key (K-PLMN).

In another embodiment, K-SIG is specific to tracking area or evolved node B (eNB) or radio access network (RAN) area or SI area (each area may comprise of one or more BS/eNB/cells/transmit-receive points (TRPs)). In one embodiment, it can be derived as follows:

K-SIG=KDF {K-PLMN, <Specific Parameter>}.

Specific Parameter being at least one of: tracking area identity (TAI), Cell ID, eNB ID, PLMN ID, RAN area ID or SI area ID.

K-PLMN is shared between the mobility management entity (MME)/operation, administration, maintenance (OAM) and the UE. UEs are provisioned with K-PLMN(s) in the universal integrated circuit card (UICC) by the network using over-the-air (OTA) or pre-provisioned in the UICC. The K-PLMNs are mapped or indexed with the PLMN-ID/TAI/Cell ID/area ID.

In case of asymmetric key or public key infrastructure (PKI), the public key for verification of the DS in the SI is provisioned in the UE (may be in UICC) by the network or securely provided to the UE via non access stratum (NAS) message or via RRC message.

Alternate Embodiments

Several types of SI may be supported in a cell. In one embodiment, each SI (or signaling message carrying SI) can be integrity protected. In another embodiment, specific SI (e.g., system information block (SIB) 1 or MIB) can be integrity protected. UE can validate this specific SI (e.g., SIB 1 or MIB) to determine whether the cell is rogue or not. The SI which is protected can be pre-defined in the system.

Figure 3A:
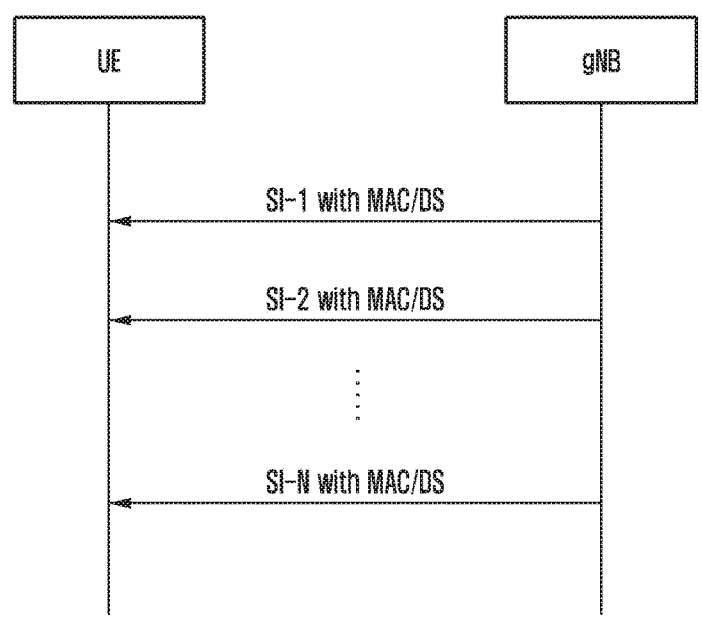
FIG. 3A shows an example where a g node B (gNB) transmits system information (SI) and message authentication code (MAC)/digital signature (DS) to a UE according to an embodiment of the present disclosure.

FIG. 3A shows an example where a g node B (gNB) transmits SI and MAC/DS to a UE according to an embodiment of the present disclosure. MAC/DS can be generated for each SI and transmitted together with each SI as shown in FIG. 3A. Note that time stamp/time counter as described above can also be transmitted together with MAC/DS.

Figure 3B:
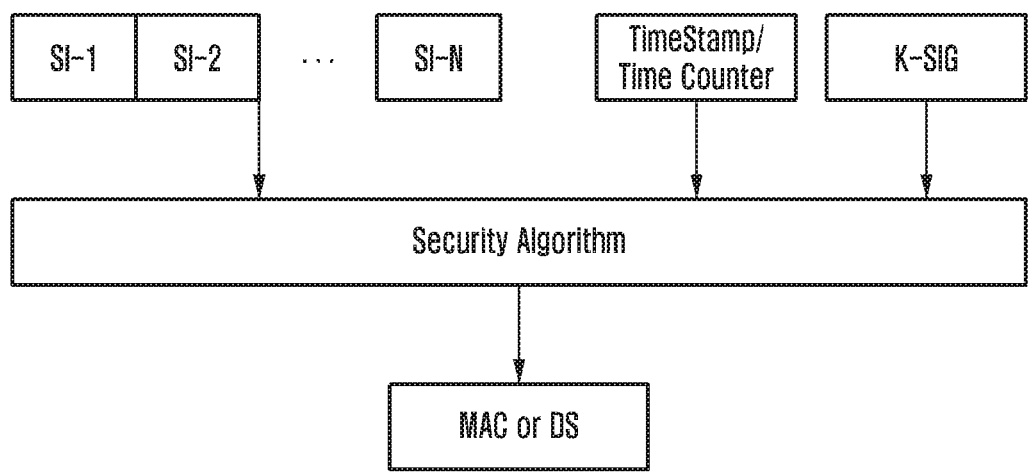
FIG. 3B shows an example where one MAC/DS is generated for multiple SI and transmitted (e.g., using separate SI message or system information block (SIB)) according to an embodiment of the present disclosure.
Figure 3C:
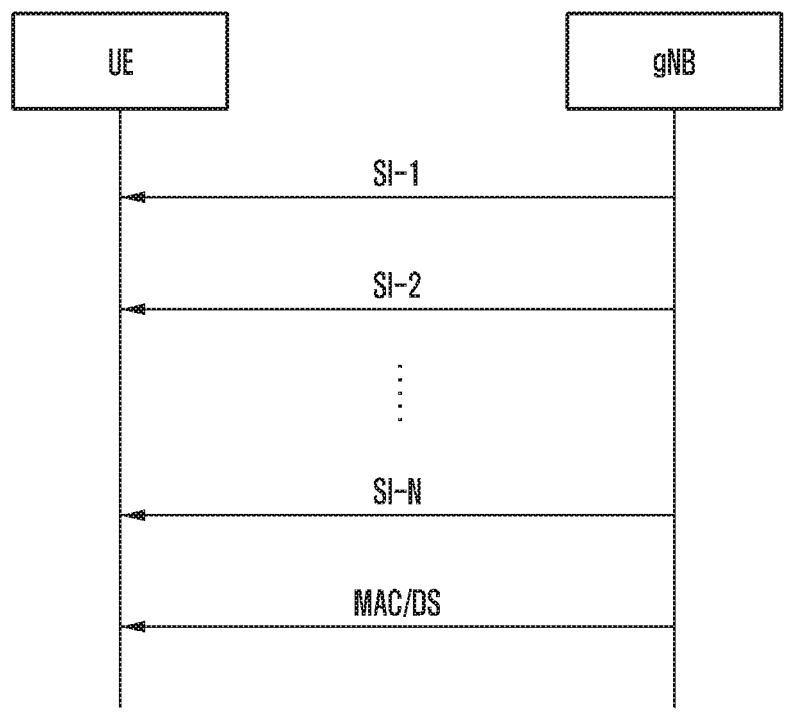
FIGS. 3C and 3D show examples where a gNB transmits multiple SI and MAC/DS to a UE in the embodiment of FIG. 3B according to an embodiment of the present disclosure.
Figure 3D:
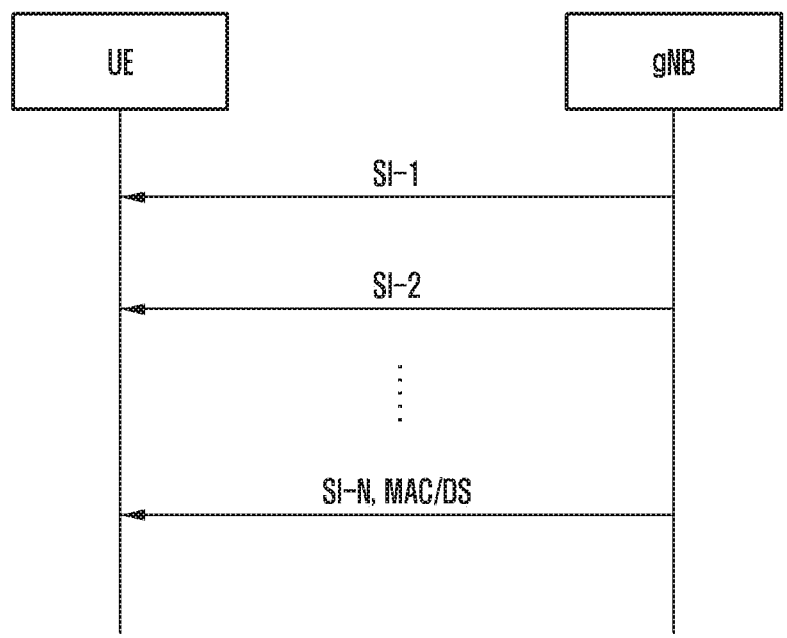

FIG. 3B shows an example where one MAC/DS is generated for multiple SI and transmitted (e.g., using separate SI message or SIB) according to an embodiment of the present disclosure. FIGS. 3C and 3D show examples where a gNB transmits multiple SI and MAC/DS to a UE in the embodiment of FIG. 3B according to an embodiment of the present disclosure. In the embodiment, wherein multiple SI is integrity protected as shown in FIG. 3A, a single MAC/DS can be generated for multiple SI and transmitted independently (e.g., using separate SI message or SIBx) as shown in FIG. 3C or 3D. Note that time stamp/time counter as described above can also be transmitted together with MAC/DS. The time stamp/time counter corresponds to SI-1 or SI-N or any specific SI.

Figure 3E:
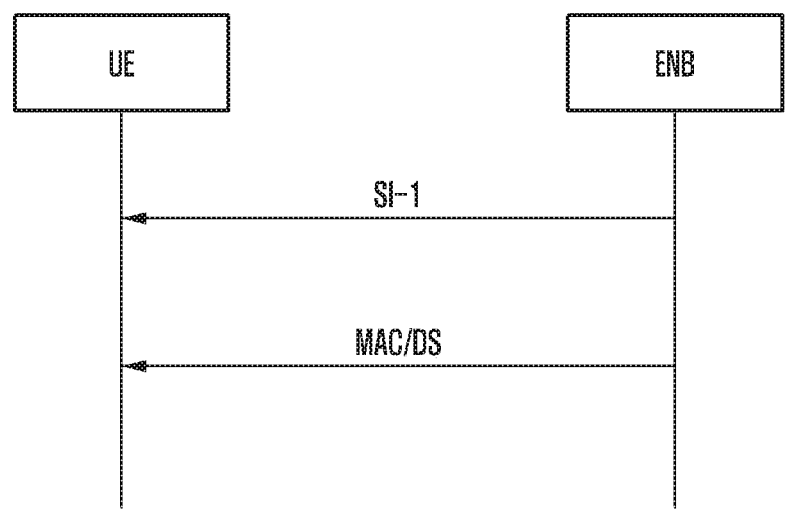
FIGS. 3E and 3F show examples where a gNB transmits SI and MAC/DS to a UE according to an embodiment of the present disclosure.
Figure 3F:
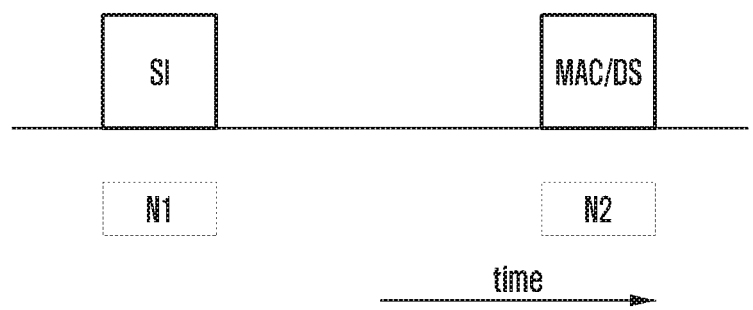

FIGS. 3E and 3F show examples where a gNB transmits SI and MAC/DS to a UE according to an embodiment of the present disclosure. MAC/DS can be generated for each SI and transmitted independently and separately (using separate SI message or SIB) from SI as shown in FIGS. 3E and 3F. Note that time stamp/time counter as described above can also be transmitted together with MAC/DS. In case the MAC/DS is transmitted separately from the associated SI, association between MAC/DS and one or more SI(s) can be indicated in message carrying MAC/DS or message carrying SI. MAC/DS itself can be transmitted as another SI. In an embodiment, MAC/DS can be periodically broadcasted or may be transmitted based on request from UE. As shown in FIG. 3F, SI, i.e., SI or signaling message carrying SI is transmitted at 'N1'. MAC/DS for SI is transmitted at 'N2'. Time difference between N1 and N2 can be fixed in the system. Alternately, SI can include information about the time at which its MAC/DS is transmitted. For example, the information about the time can be absolute frame/subframe number of time slot N2 or it can be offset information with respect to N1. Alternately, information can be included together with MAC/DS which indicates the information about its corresponding SI and time at which that SI was transmitted. For example, it can indicate that this MAC/DS is for SI-1 transmitted in time slot T. In case MAC/DS is transmitted separately from the associated SI, the time stamp/counter for generating MAC/DS can be corresponding to time slot in which associated SI is transmitted/received. UE receives the SI in time slot N1 and corresponding MAC/DS in time slot N2. In order to validate the authenticity of the received SI, UE generates the MAC/DS for the received SI using SI received in time slot N1, security key (K-SIG) and time stamp/time counter of the time slot N1 in which SI is received as described above. Alternately, in case MAC/DS is transmitted separately from the associated SI, the time stamp/counter for generating MAC/DS can be corresponding to time slot in which MAC/DS is transmitted/received. UE receives the SI in time slot N1 and corresponding MAC/DS in time slot N2. In order to validate the authenticity of the received SI, UE generates the MAC/DS for the received SI using SI received in time slot N1, security key (K-SIG) and time stamp/time counter of the time slot N2 in which MAC/DS is received as described above.

In one embodiment, the SI message carrying SI, MAC/DS and time stamp/counter can be fragmented and then transmitted. In this case, time stamp/time counter used in transmitter and receiver for MAC/DS validation can correspond to time slot in which first fragment is received. In alternate embodiment, it can correspond to time slot in which last fragment is received.

FIG. 4 shows an example where a message with MAC/DS is periodically transmitted according to an embodiment of the present disclosure. Note that time stamp/time counter as described above can also be transmitted together with MAC/DS. This message can be randomly generated bits. This message can be specific SI message. For example, it can be first SIB 1 in SFN cycle. Period can be SFN cycle or longer. Period can be pre-defined or signaled by network in NAS or access stratum (AS) signaling. UE can receive this and use it to validate MAC/DS to determine whether cell is rogue or not.

In order to reduce signaling overhead of MAC/DS, in one embodiment, if SI is periodically transmitted then instead of integrity protecting SI every period, SI can be protected once every N period. N can be pre-defined or signaled in scheduling information. In an example, UE can determine the SI window where SI message is transmitted with protection and without protection as follows:

SI window determination for an SI message with SI period T,
x=(Wn−1)*w, where Wn is window number and w is window length,
a=x mod N1, where N1 is the number of TTIs (or subframes) in a radio frame,
SI window starts at the subframe #a, in the radio frame for which SFN mod T=FLOOR(x/N1).

SI window determination for a secured SI message with SI period T,
x=(Wn−1)*w, where Wn is window number and w is window length,
a=x mod N1, where N1 is the number of TTIs (or subframes) in a radio frame,
SI window starts at the subframe #a, in the radio frame for which SFN mod T*N=FLOOR(x/N1).

Alternately, SI includes information indicating whether it is protected or not. This information may be included in one of the header fields in PDU carrying SI. Alternately, security information such as MAC/DS, time stamp/time counter can be an optional information element in SI which is included if SI is protected. If not protected SI may include information about the next SI occasion in which this SI is protected. UE interested in validating may receive SI at that occasion.

It is to be noted that above method is described for signaling message carrying SI. However, it can be applied to any signaling message broadcasted by network. It is to be noted that in alternate embodiments BS/eNB can be 5G node B or transmission point or central node controlling various transmission points. In an embodiment, based on the request from the UE (other SI), the eNB transmit the SI with MAC/DS either in unicast RRC message or as a regular SI broadcast (if there are more than one requests).

Proposed Method 2: On Demand SI with Security:

In next generation system, SI can be signaled to UE on demand. UE may enter RRC connected from RRC idle state and then request the desired SI. However, this leads to significant signaling overhead because of random access procedure signaling, connection setup signaling, radio bearer configuration signaling and security activation signaling. An enhanced method, wherein SI message can be securely received on demand, is needed.

Figure 5A:
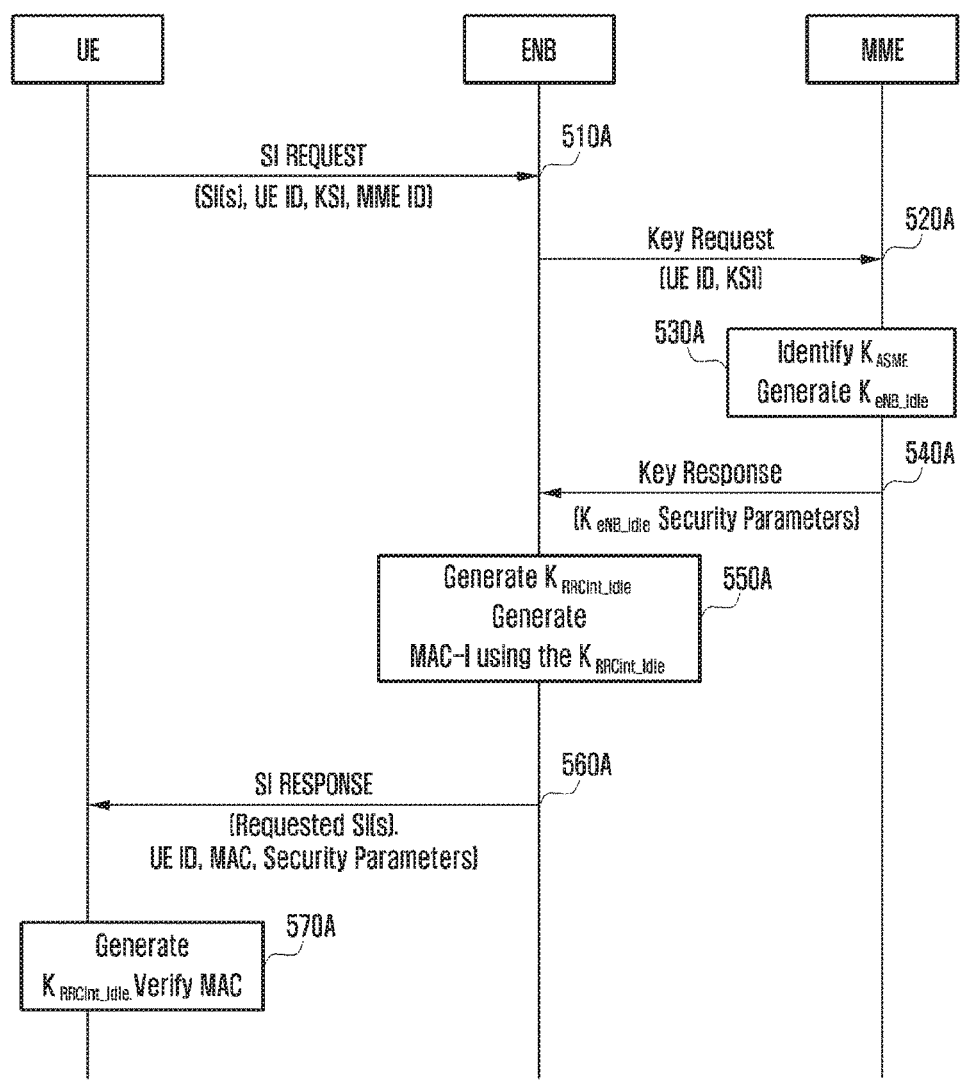
FIG. 5A illustrates the procedure for receiving SI message securely according to an embodiment of Proposed Method 2.

FIG. 5A illustrates the procedure for receiving SI message securely according to an embodiment of Proposed Method 2.

Referring to FIG. 5A, UE sends SI request at operation 510A. The request may include at least one of UE identity (e.g., system architecture evolution (SAE)-temporary mobile subscriber identity (S-TMSI)), key set identifier (KSI) and MME ID. It may also include information on which SI(s) are needed by UE. If UE Nonce is used for generating $K_{eNB\_Idle}$, then UE may send UE Nonce in the request.

ENB sends the key request to MME identified by MME ID received from UE at operation 520A. UE ID and KSI received from UE may be sent to MME in key request.

MME identifies the security key $K_{ASME}$ (as defined in TS 33.401) using the KSI and generates $K_{eNB\_Idle}$ at operation 530A. $K_{eNB\_Idle}$ can be generated using one of the following ways:

1. $K_{eNB\_Idle}$=KDF $\{K_{ASME}, KeNB\_Idle\_Counter\}$. Note that counter is updated every time a new $K_{eNB\_Idle}$ is generated.
2. $K_{eNB\_Idle}$=KDF $\{K_{ASME}, UE\ Nonce\}$. UE sends the UE Nonce to eNB when sending SI request.
3. $K_{eNB\_Idle}$=KDF $\{K_{ASME}, SI\ Algo\ ID\ (algorithm\ identifier)\}$.
4. $K_{eNB\_Idle}$=KDF $\{K_{ASME}, Network\ Nonce\}$. Network (NW) sends the Network Nonce to UE when sending SI response.
5. $K_{eNB\_Idle}$=KDF $\{NH\ (as\ defined\ in\ TS\ 33.401)/KeNB, SI\ Algo\ ID\}$.
6. $K_{eNB\_Idle}$=KeNB.

MME sends the generated $K_{eNB\_Idle}$ to eNB at operation 540A. Security parameters like KeNB_Idle_Counter or Network Nonce is also sent to eNB.

ENB prepares SI-Response based on SI request at operation 550A. ENB generates security key $K_{RRCInt\_Idle}$ for integrity protection from $K_{eNB\_Idle}$. Security key $K_{RRCInt\_Idle}$ is then used to generate MAC for SI response.

ENB sends SI response to UE at operation 560A. It may include MAC and Security parameters. Security parameters may include security algorithm, KeNB_Idle_Counter or Network Nonce.

At operation 570A, UE generates $K_{eNB\_Idle}$ using $K_{ASME}$ using one of the following ways:

1. $K_{eNB\_Idle}$=KDF $\{K_{ASME}, KeNB\_Idle\_Counter\}$.
2. $K_{eNB\_Idle}$=KDF $\{K_{ASME}, UE\ Nonce\}$. UE sends the UE Nonce to eNB when sending SI request.
3. $K_{eNB\_Idle}$=KDF $\{K_{ASME}, SI\ Algo\ ID\}$.
4. $K_{eNB\_Idle}$=KDF $\{K_{ASME}, Network\ Nonce\}$.
5. $K_{eNB\_Idle}$=KDF $\{NH/KeNB, SI\ Algo\ ID\}$.
6. $K_{eNB\_Idle}$=KeNB.

UE then generates security key $K_{RRCInt\_Idle}$ for integrity verification from $K_{eNB\_Idle}$. UE then generates MAC for SI response using security key $K_{RRCInt\_Idle}$. If the generated MAC is same as MAC received from eNB, UE considers eNB as authentic.

Various embodiments of the above procedure are described below.

Embodiment 1

Figure 5B:
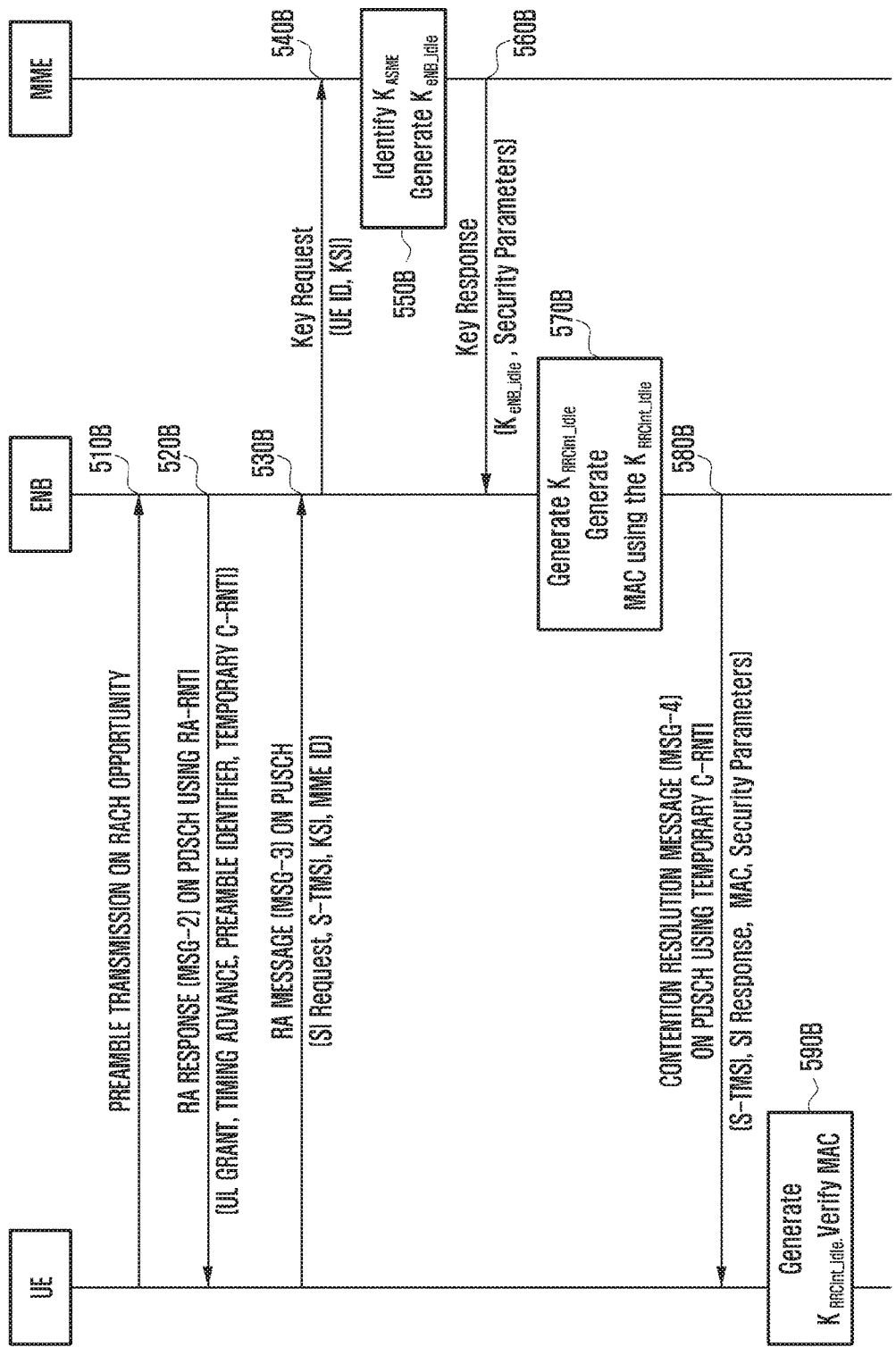
FIG. 5B illustrates on demand SI with security according to the first embodiment of the present disclosure.

FIG. 5B illustrates on demand SI with security according to the first embodiment of the present disclosure.

Referring to FIG. 5B, UE randomly selects one preamble sequence from preamble sequences for transmission on the physical random access channel (PRACH) and transmits the selected preamble on the PRACH opportunity at operation 510B. The preamble sequences may be partitioned into multiple groups. If the preamble sequences are partitioned into multiple groups based on message size, UE selects the preamble from one of the groups depending on the size of the message it is expecting to be sent in RA message (Msg3).

If eNB detects the preamble transmission on the PRACH from one or more UEs, it sends the random access (RA) response (RAR) on the physical downlink shared channel (PDSCH) addressed by the PDCCH using random access-radio network temporary identifier (RA-RNTI) within the RA response window at operation 520B. The RA response (Msg2) may include at least one of one or more RARs each including the initial UL grant, timing advance, RA preamble identifier (RAPID) and temporary C-RNTI for each detected preamble.

UEs for which the RAPID matches with the RA preamble sequence transmitted in operation 510B, transmits RA message (Msg3) on the physical uplink shared channel (PUSCH) at the specified uplink (UL) grant in Msg2 at operation 530B. Normally, Msg3 includes a RRC connection request, a tracking area update or a scheduling request.

Also, hybrid automatic repeat request (HARQ) is used for Msg3 transmission. In this embodiment, Msg3 is modified to indicate SI request. Msg3 may include at least one of UE identity (e.g., S-TMSI), SI request, KSI and MME ID. If UE Nonce is used for generating $K_{eNB\_Idle}$, then UE may send UE Nonce in Msg3. With the transmission of Msg3, contention resolution timer may be started. The value of the contention resolution timer can be set to higher value compared normal contention resolution timer to allow eNB time to execute operations 540B, 550B and 560B.

ENB sends the key request to MME identified by MME ID received from UE at operation 540B. UE ID and KSI received from UE may be sent to MME in key request.

MME identifies the $K_{ASME}$ using the KSI and generates $K_{eNB\_Idle}$ at operation 550B. $K_{eNB\_Idle}$ can be generated using one of the following ways:
1. $K_{eNB\_Idle}$=KDF {$K_{ASME}$, KeNB_Idle_Counter}. Note that counter is updated every time a new $K_{eNB\_Idle}$ is generated.
2. $K_{eNB\_Idle}$=KDF {$K_{ASME}$, UE Nonce}. UE sends the UE Nonce to eNB when sending SI request.
3. $K_{eNB\_Idle}$=KDF {$K_{ASME}$, SI Algo ID}.
4. $K_{eNB\_Idle}$=KDF {$K_{ASME}$, Network Nonce}. NW sends the Network Nonce to UE when sending SI response.
5. $K_{eNB\_Idle}$=KDF {NH/KeNB, SI Algo ID}.
6. $K_{eNB\_Idle}$=KeNB.

MME sends the key response to eNB at operation 560B. The generated $K_{eNB\_Idle}$ may be sent to eNB. Security parameters like KeNB_Idle_Counter or Network Nonce may also be sent to eNB.

ENB prepares SI-Response based on SI request at operation 570B. ENB generates security key $K_{RRCInt\_Idle}$ for integrity protection from $K_{eNB\_Idle}$. Security key $K_{RRCInt\_Idle}$ is then used to generate MAC for SI response.

ENB sends Contention resolution message (Msg4) on the PDSCH addressed by the PDCCH using temporary C-RNTI operation 580B. Msg4 may include at least one of the UE identity (e.g., S-TMSI) sent in Msg3, SI response, MAC and Security parameters. Security parameters may include security algorithm, KeNB_Idle_Counter or Network Nonce.

At operation 590B, UE generates $K_{eNB\_Idle}$ using $K_{ASME}$ using one of the following ways:
1. $K_{eNB\_Idle}$=KDF {$K_{ASME}$, KeNB_Idle_Counter}.
2. $K_{eNB\_Idle}$=KDF {$K_{ASME}$, UE Nonce}. UE sends the UE Nonce to eNB when sending SI request.
3. $K_{eNB\_Idle}$=KDF {$K_{ASME}$, SI Algo ID}.
4. $K_{eNB\_Idle}$=KDF {$K_{ASME}$, Network Nonce}.
5. $K_{eNB\_Idle}$=KDF {NH/KeNB, SI Algo ID}.
6. $K_{eNB\_Idle}$=KeNB.

UE then generates security key $K_{RRCInt\_Idle}$ for integrity verification from $K_{eNB\_Idle}$. UE then generates MAC for SI-Response using security key $K_{RRCInt\_Idle}$. If the generated MAC is same as MAC received from eNB, UE processes the received SI in SI-Response.

Figure 5C:
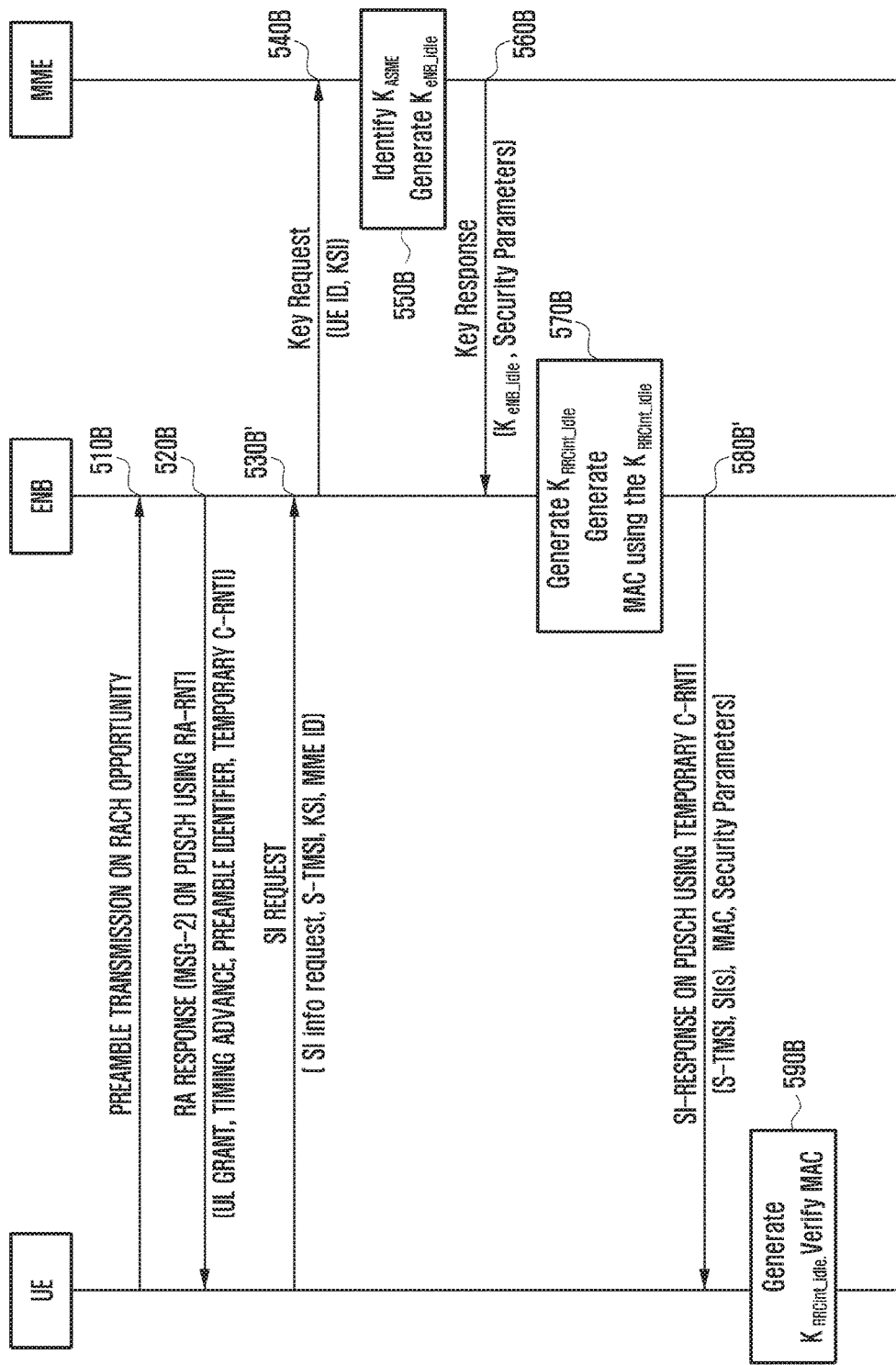
FIG. 5C illustrates on demand SI with security according to an alternative embodiment of the present disclosure.

In an alternate embodiment, UE can also include MAC in operation 530B which can be verified by eNB after operation 560B. FIG. 5C illustrates on demand SI with security according to an alternative embodiment of the present disclosure. Referring to FIG. 5C, instead of MSG3 which is sent to the eNB at operation 530B and MSG4 which is sent to the UE at operation 580B in FIG. 5B, SI Request which sent to the eNB at operation 530B' and SI response which is sent to the UE at operation 580B' are used for SI on demand.

Temporary C-RNTI may be released after 580B in FIGS. 5B and 5C, if the UE moves to RRC Idle state.

Embodiment 2

Figure 6:
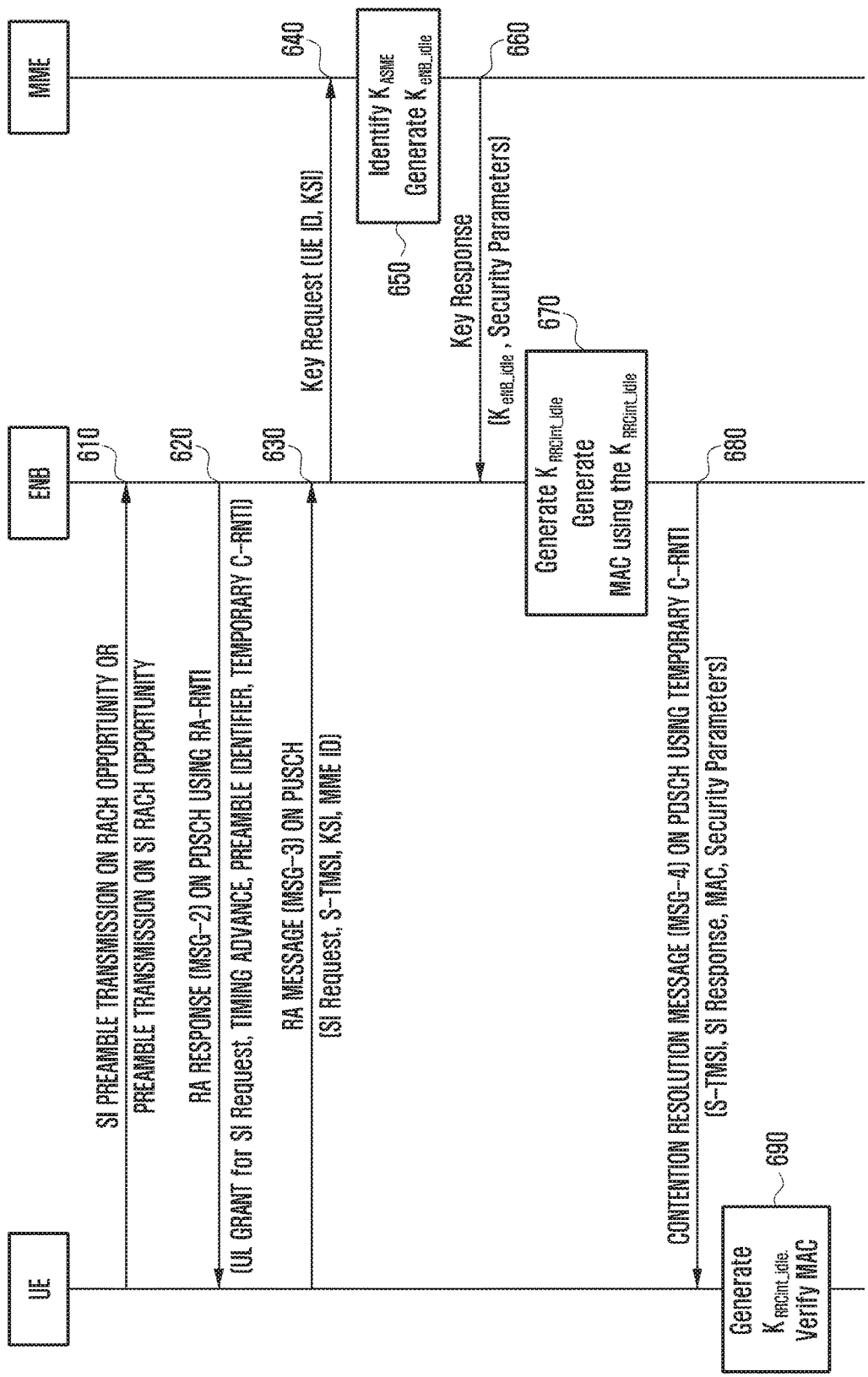
FIG. 6 illustrates on demand SI with security according to the second embodiment of the present disclosure.

FIG. 6 illustrates on demand SI with security according to the second embodiment of the present disclosure.

Operation 610: In this embodiment, one or more preamble sequences can be reserved for SI request. If the UE wants to transmit SI request, it selects one preamble from preambles reserved for SI request. Alternatively, PRACH opportunities are time multiplexed for normal RACH and SI request RACH. UE randomly selects one of the preamble sequences for transmission on the SI request RACH opportunity. In one embodiment, multiple RACH preambles or RACH opportunity may be reserved for specific SI or set of SIs.

Operations 620 to 690: Respectively the same as in Embodiment 1 (i.e., Operation 520B to 590B in FIG. 5B).

In an alternate embodiment, UE can also include MAC in operation 630 which can be verified by eNB after operation 660. In alternate embodiment, instead of MSG3 and MSG4, SI Request and SI response can be used for SI on demand.

Temporary C-RNTI may be released after operation 680 in FIG. 6.

In this embodiment, SI response can also be sent using some predefined RNTI instead of temporary C-RNTI. In RA response temporary C-RNTI is not needed or signaled.

Embodiment 3

Figure 7:
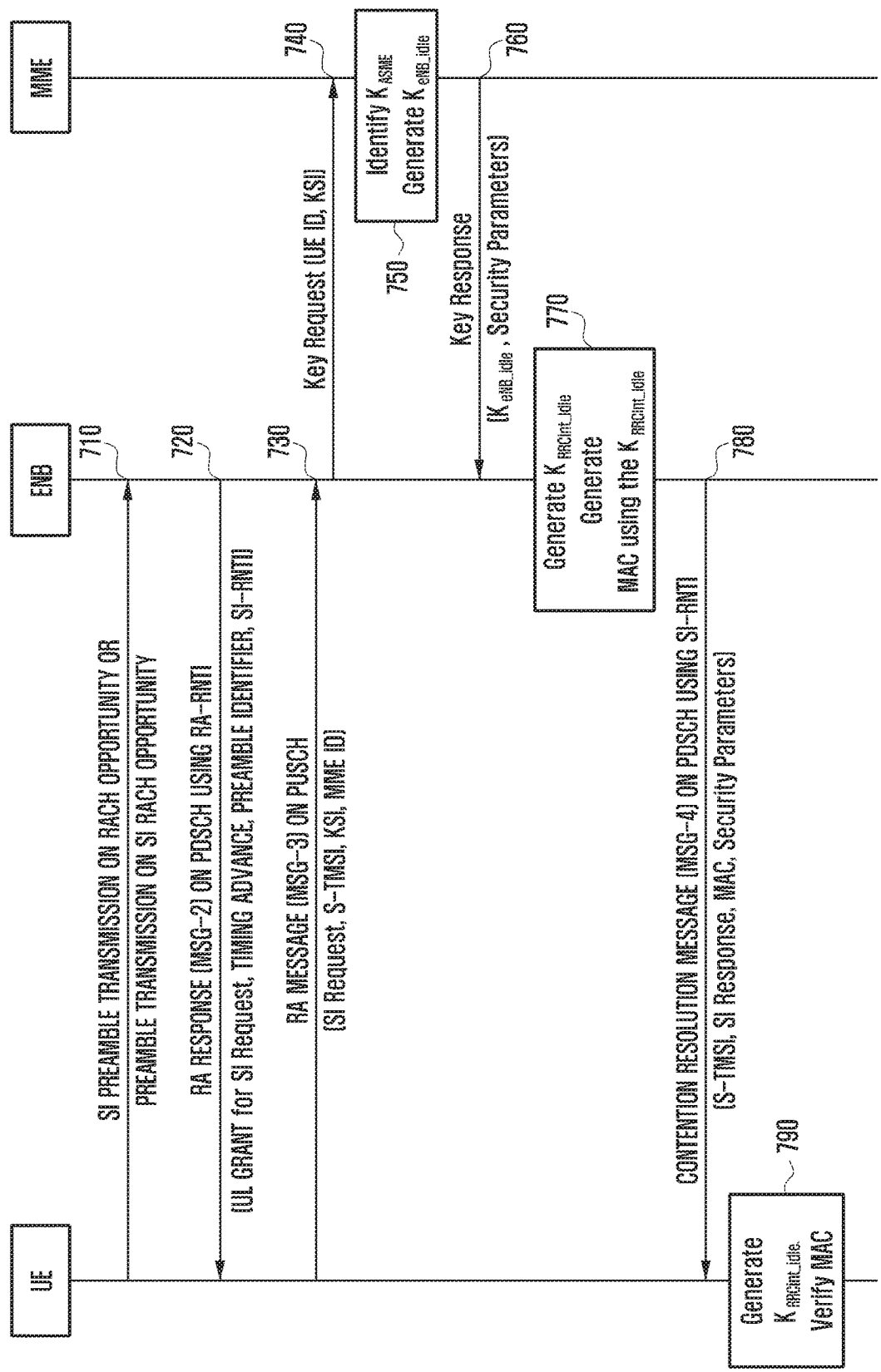
FIG. 7 illustrates on demand SI with security according to the third embodiment of the present disclosure.

FIG. 7 illustrates on demand SI with security according to the third embodiment of the present disclosure.

Operations 610, 630, 640, 650, 660, 670, and 690 of Embodiment 3 is same as operations 710, 730, 740, 750, 760, 770, and 790 in Embodiment 2 except that instead of temporary C-RNTI used in operations 620 and 680, SI-RNTI is assigned to UE in operations 720 and 780.

In an alternate embodiment, UE can also include MAC in operation 730 which can be verified by eNB after operation 760. In alternate embodiment, instead of MSG3 and MSG4, SI Request and SI response can be used for SI on demand.

SI-RNTI may be released after operation 780 in FIG. 7.

In this embodiment, SI response can also be sent using some predefined RNTI instead of SI-RNTI. In RA response SI-RNTI is not needed or signaled.

Embodiment 4

Figure 8:
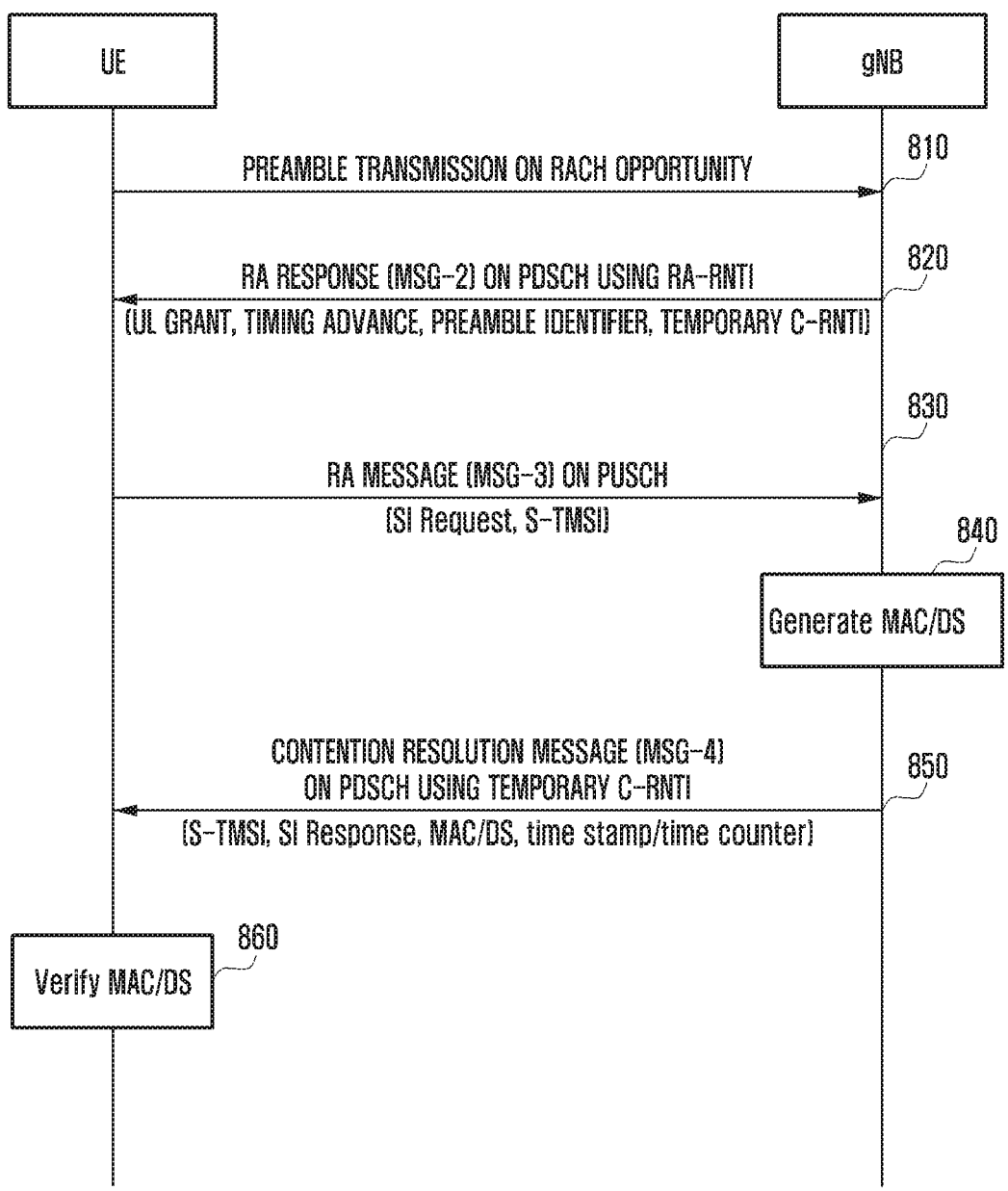
FIG. 8 illustrates on demand SI with security according to the fourth embodiment of the present disclosure.

FIG. 8 illustrates on demand SI with security according to the fourth embodiment of the present disclosure. Here, operations 810, 820, and 830 are similar to operations 510B, 520B, and 530B of FIG. 5B except that an MME ID is not send to a eNB at operation 830. In this embodiment, eNB generates DS over SI response using the security key and time stamp/time counter at operation 840, as described in FIG. 1 and Proposed Method 1. UE validates the DS as in Proposed Method 1 and accordingly determines whether eNB is rogue or not at operation 860. In this embodiment, SI response can also be sent at operation 850, using some predefined RNTI (may not be UE specific) instead of Temporary C-RNTI. In RA response Temporary C-RNTI is not needed or signaled.

C-RNTI may be released after operation 850 in FIG. 8.

It is to be noted that in alternate embodiments BS/eNB can be 5G node B or transmission point or central node controlling various distribution/transmission points. It is to be noted that in alternate embodiments MME (access and mobility function (AMF) in case of 5G) can be a control entity or entity performing security functions in core network. In case core network is sliced, this control entity or MME or AMF can be specific to network slice or common for all network slices or can belong to default network slice. Accordingly, network slice ID or control entity ID or service ID can be used in place of MME ID in these embodiments.

In Embodiments 1 to 4 of Proposed Method 2, there is no need for UE to enter RRC connected state. UE can securely receive the system information in idle state.

Figure 9A:
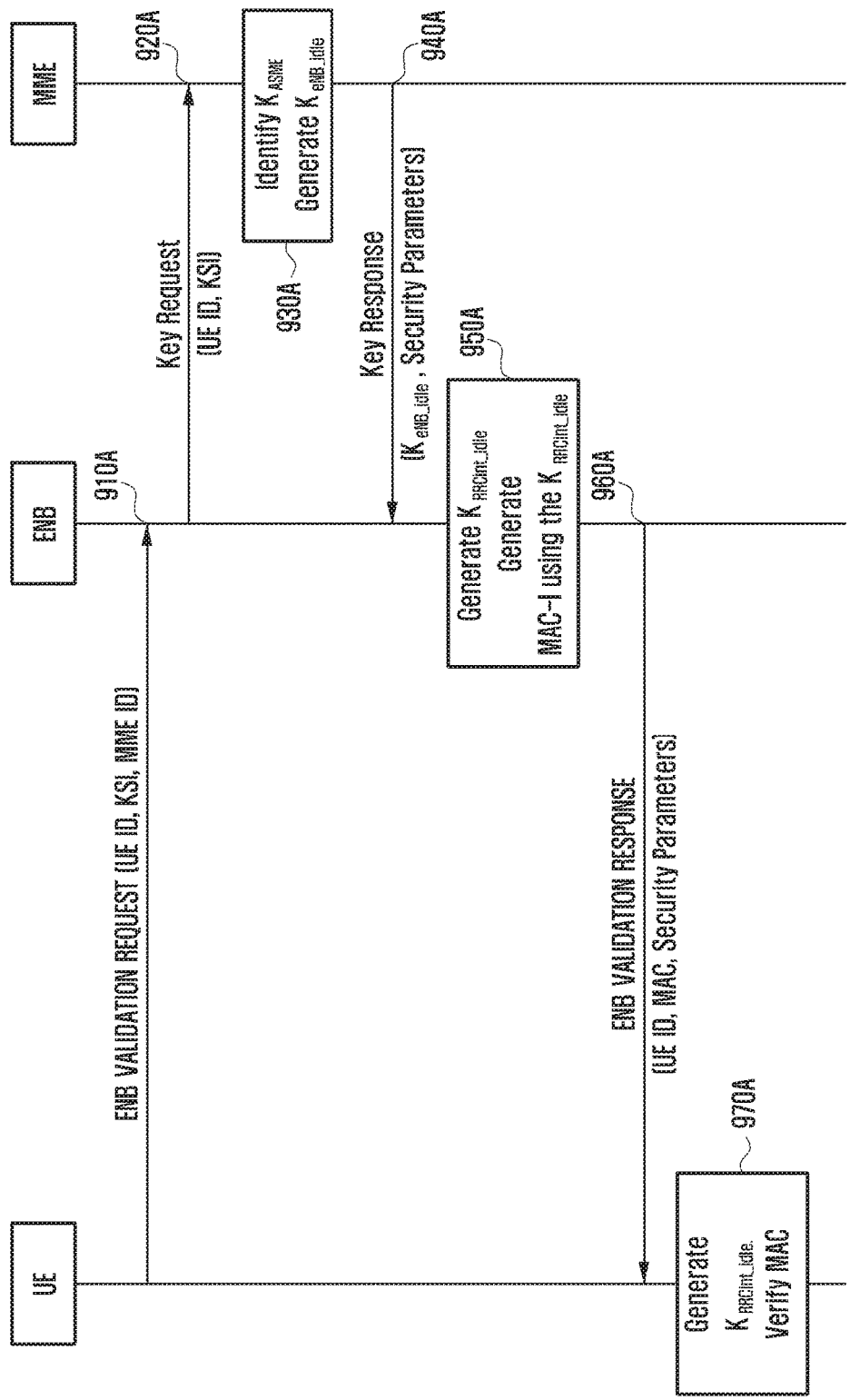
FIG. 9A illustrates the procedure for validation according to an embodiment of Proposed Method 3.

Proposed Method 3: eNB Validation in Idle/Inactive State Using AS:

In this method, RRC idle or RRC inactive UE validates whether eNB (or cell or BS or gNB) is rogue or not as and when needed. FIG. 9A illustrates the procedure for validation according to an embodiment of Proposed Method 3.

Referring to FIG. 9A, UE sends eNB validation request at operation 910A. The request may include at least one of UE identity (e.g., S-TMSI), KSI and MME ID. If UE Nonce is used for generating $K_{eNB\_Idle}$, then UE sends UE Nonce in the request.

ENB sends the key request to MME identified by MME ID received from UE at operation 920A. UE ID and KSI received from UE may be sent to MME in key request.

MME identifies the $K_{ASME}$ using the KSI and generates $K_{eNB\_Idle}$ at operation 930A. $K_{eNB\_Idle}$ can be generated using one of the following ways:
1. $K_{eNB\_Idle}$=KDF {$K_{ASME}$, KeNB_Idle_Counter}. Note that counter is updated every time a new $K_{eNB\_Idle}$ is generated.
2. $K_{eNB\_Idle}$=KDF {$K_{ASME}$, UE Nonce}. UE sends the UE Nonce to eNB when sending validation request.
3. $K_{eNB\_Idle}$=KDF {$K_{ASME}$, Validation Algo ID}.
4. $K_{eNB\_Idle}$=KDF {$K_{ASME}$, Network Nonce}. NW sends the Network Nonce to UE when sending validation response.
5. $K_{eNB\_Idle}$=KDF {NH/KeNB, Validation Algo ID}.
6. $K_{eNB\_Idle}$=KeNB.

MME sends the generated $K_{eNB\_Idle}$ to eNB at operation 940A. Security parameters like KeNB_Idle_Counter or Network Nonce is also sent to eNB.

ENB prepares validation-Response based on validation request at operation 950A. ENB generates security key $K_{RRCInt\_Idle}$ for integrity protection from $K_{eNB\_Idle}$. Security key $K_{RRCInt\_Idle}$ is then used to generate MAC for validation response.

ENB sends validation response to UE at operation 960A. It may include MAC and Security parameters. Security parameters may include security algorithm, KeNB_Idle_Counter or Network Nonce.

At operation 970A, UE generate $K_{eNB\_Idle}$ using $K_{ASME}$ using one of the following ways:
1. $K_{eNB\_Idle}$=KDF {$K_{ASME}$, KeNB_Idle_Counter}.
2. $K_{eNB\_Idle}$=KDF {$K_{ASME}$, UE Nonce}. UE sends the UE Nonce to eNB when sending validation request.
3. $K_{eNB\_Idle}$=KDF {$K_{ASME}$, Validation Algo ID}.
4. $K_{eNB\_Idle}$=KDF {$K_{ASME}$, Network Nonce}.
5. $K_{eNB\_Idle}$=KDF {NH/KeNB, Validation Algo ID}.
6. $K_{eNB\_Idle}$=KeNB.

UE then generates security key $K_{RRCInt\_Idle}$ for integrity verification from $K_{eNB\_Idle}$. UE then generates MAC for eNB validation response using security key $K_{RRCInt\_Idle}$. If the generated MAC is same as MAC received from eNB, UE considers eNB as authentic.

Various embodiments of the above procedure are described below.

Embodiment 1

Figure 9B:
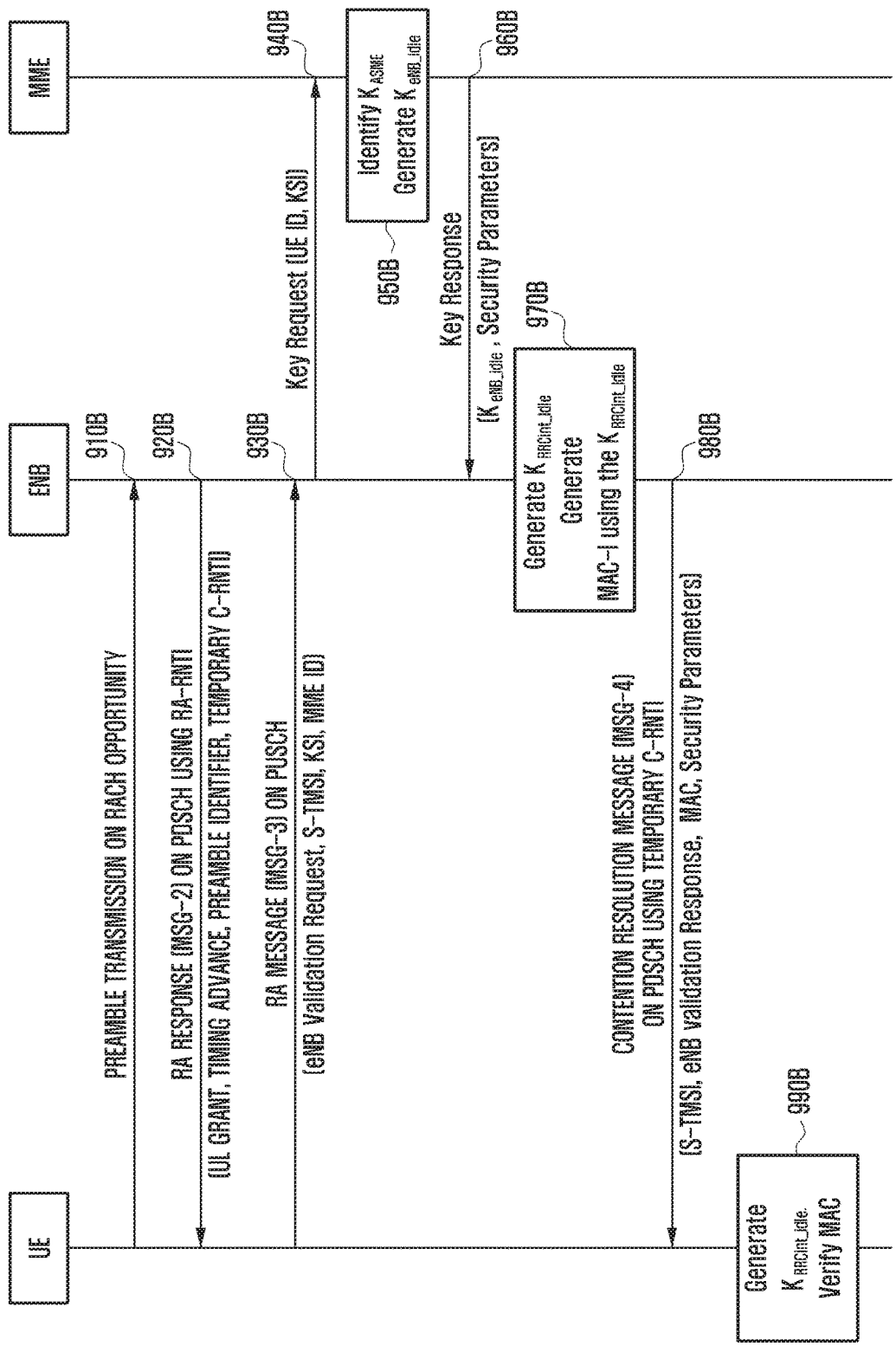
FIG. 9B illustrates evolved node B (eNB) validation in idle/inactive state using access stratum (AS) according to a first embodiment of the present disclosure.

FIG. 9B illustrates eNB validation in idle/inactive state using AS according to the first embodiment of the present disclosure.

Referring to FIG. 9B, UE randomly selects one preamble sequence from preamble sequences for transmission on the PRACH and transmits the selected preamble on the PRACH opportunity at operation 910B. The preamble sequences may be partitioned into multiple groups. If the preamble sequences are partitioned into multiple groups based on message size, UE selects the preamble from one of the groups depending on the size of the message it is expecting to be sent in RA message (Msg3).

If eNB detects the preamble transmission on the PRACH from one or more UEs, it sends the RA response (RAR) on the PDSCH addressed by the PDCCH using RA-RNTI within the RA response window at operation 920B. The RA response (Msg2) may include at least one of one or more RARs each including the initial UL grant, timing advance, RA preamble identifier (RAPID) and temporary C-RNTI for each detected preamble.

UEs for which the RAPID matches with the RA preamble sequence transmitted in operation 910B, transmits RA message (Msg3) on the PUSCH at the specified UL grant in Msg2 at operation 930B. Normally, Msg3 includes a RRC connection request, a tracking area update or a scheduling request. Also, HARQ is used for Msg3 transmission. In this embodiment, Msg3 is modified to indicate eNB validation request. Msg3 may include at least one of UE identity (e.g., S-TMSI), eNB validation request, KSI and MME ID. If UE Nonce is used for generating $K_{eNB\_Idle}$, then UE sends UE Nonce in Msg3. With the transmission of Msg3, contention resolution timer may be started. The value of the contention resolution timer can be set to higher value compared normal contention resolution timer to allow eNB time to execute operations 940B, 950B and 960B.

ENB sends the key request to MME identified by MME ID received from UE at operation 940B. UE ID and KSI received from UE may be sent to MME in key request.

MME identifies the $K_{ASME}$ using the KSI and generates $K_{eNB\_Idle}$ at operation 950B. $K_{eNB\_Idle}$ can be generated using one of the following ways:
1. $K_{eNB\_Idle}$=KDF {$K_{ASME}$, KeNB_Idle_Counter}. Note that counter is updated every time a new $K_{eNB\_Idle}$ is generated.
2. $K_{eNB\_Idle}$=KDF {$K_{ASME}$, UE Nonce}. UE sends the UE Nonce to eNB when sending validation request.
3. $K_{eNB\_Idle}$=KDF {$K_{ASME}$, Validation Algo ID}.
4. $K_{eNB\_Idle}$=KDF {$K_{ASME}$, Network Nonce}. NW sends the Network Nonce to UE when sending validation response.
5. $K_{eNB\_Idle}$=KDF {NH/KeNB, Validation Algo ID}.
6. $K_{eNB\_Idle}$=KeNB.

MME sends the key response to eNB at operation 960B. The generated $K_{eNB\_Idle}$ may be sent to eNB. Security parameters like KeNB_Idle_Counter or Network Nonce may also be sent to eNB.

ENB prepares validation-Response based on validation request at operation 970B. ENB generates security key $K_{RRCInt\_Idle}$ for integrity protection from $K_{eNB\_Idle}$. Security key $K_{RRCInt\_Idle}$ is then used to generate MAC for validation response.

ENB sends Contention resolution message (Msg4) on the PDSCH addressed by the PDCCH using temporary C-RNTI operation 980B. Msg4 may include at least one of the UE identity (e.g., S-TMSI) sent in Msg3, SI/eNB validation response, MAC and Security parameters. Security parameters may include security algorithm, KeNB_Idle_Counter or Network Nonce.

At operation 990B, UE generate $K_{eNB\_Idle}$ using $K_{ASME}$ using one of the following ways:
1. $K_{eNB\_Idle}$=KDF {$K_{ASME}$, KeNB_Idle_Counter}.
2. $K_{eNB\_Idle}$=KDF {$K_{ASME}$, UE Nonce}. UE sends the UE Nonce to eNB when sending validation request.
3. $K_{eNB\_Idle}$=KDF {$K_{ASME}$, Validation Algo ID}.
4. $K_{eNB\_Idle}$=KDF {$K_{ASME}$, Network Nonce}.
5. $K_{eNB\_Idle}$=KDF {NH/KeNB, Validation Algo ID}.
6. $K_{eNB\_Idle}$=KeNB.

UE then generates security key $K_{RRCInt\_Idle}$ for integrity verification from $K_{eNB\_Idle}$. UE then generates MAC for eNB validation response using security key $K_{RRCInt\_Idle}$. If the generated MAC is same as MAC received from eNB, UE considers eNB as authentic.

C-RNTI may be released after operation 980B in FIG. 9B.

Embodiment 2

Figure 9C:
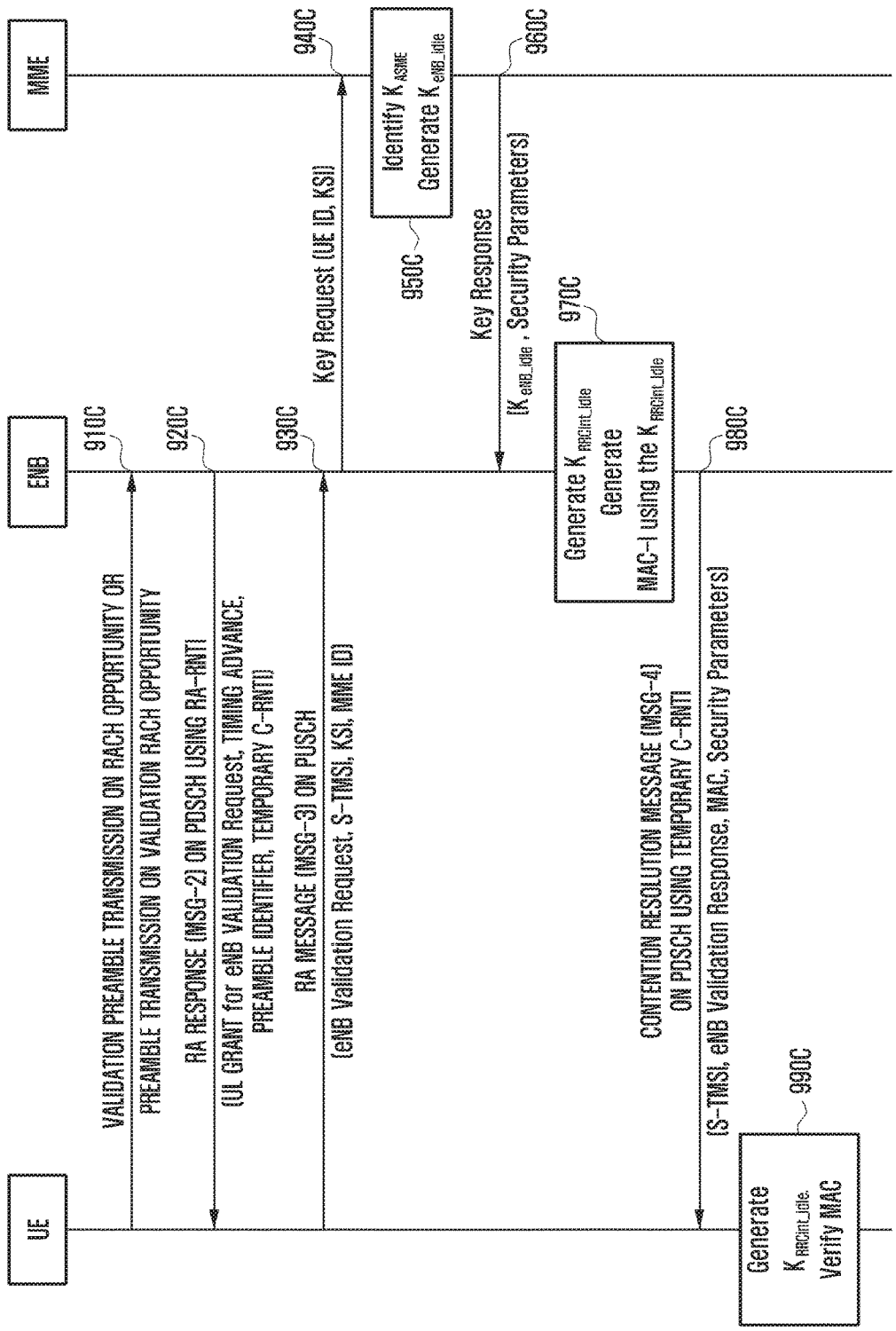
FIG. 9C illustrates eNB validation in idle/inactive state using AS according to a second embodiment of the present disclosure.

FIG. 9C illustrates eNB validation in idle/inactive state using AS according to the second embodiment of the present disclosure.

Operation 910C: In this embodiment, one or more preamble sequences can be reserved for eNB validation request. If the UE wants to transmit eNB validation request, it selects one preamble from preambles reserved for eNB validation request. Alternatively, PRACH opportunities are time multiplexed for normal RACH and eNB validation request RACH. UE randomly selects one of the preamble sequences for transmission on the eNB validation request RACH opportunity.

Operations 920C to 990C are respectively the same as operations 920B to 990B in FIG. 9B of Embodiment 1.

Temporary C-RNTI may be released after operation 980C in FIG. 9C.

In this embodiment, validation response can also be sent using some predefined RNTI instead of temporary C-RNTI. In RA response temporary C-RNTI is not needed or signaled. In an alternate embodiment, UE can also include MAC in operation 930C which can be verified by eNB after operation 960C. In alternate embodiment, instead of MSG3 and MSG4, validation Request and validation response can be used for SI on demand.

Embodiment 3

Figure 10:
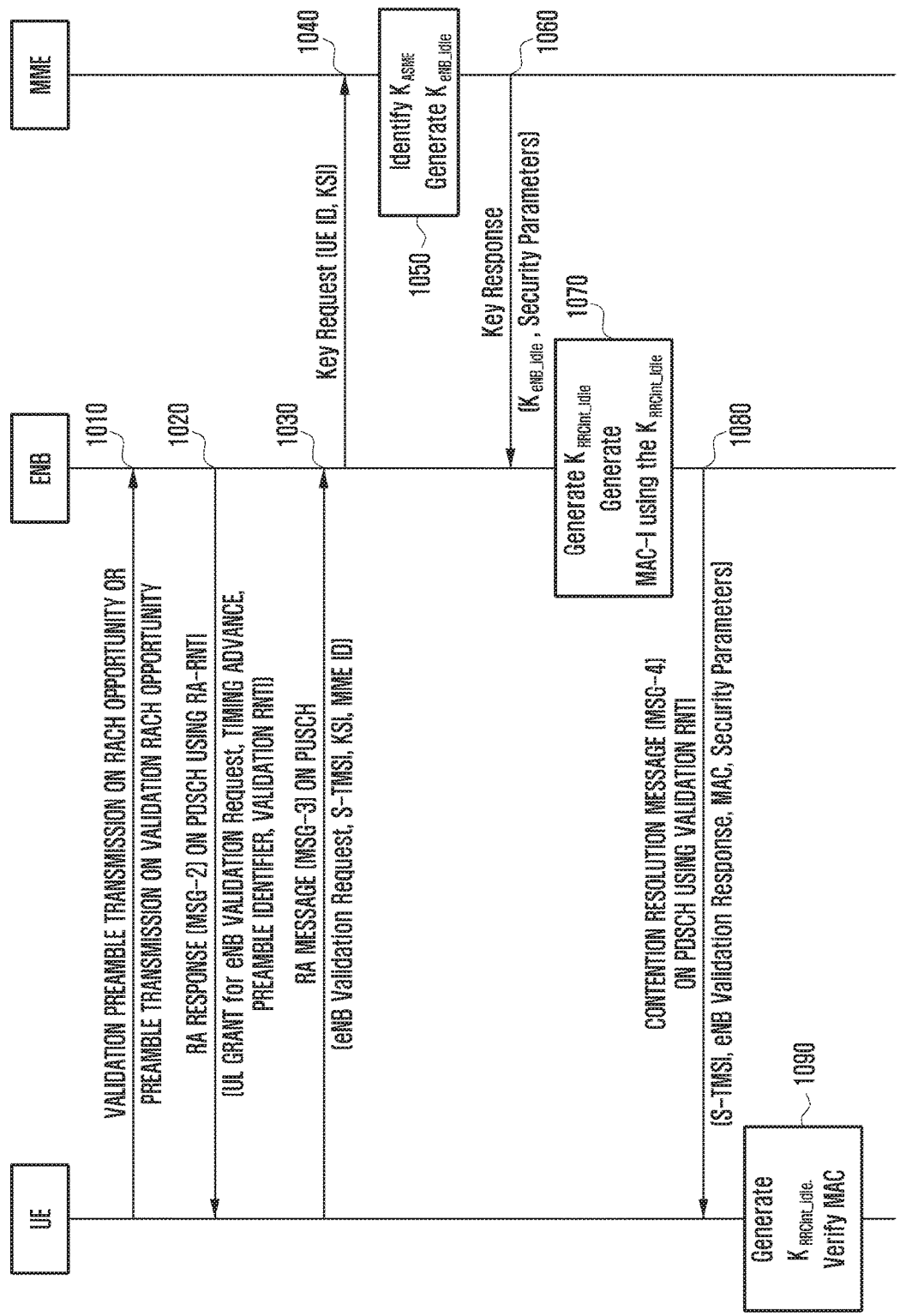
FIG. 10 illustrates eNB validation in idle/inactive state using AS according to a third embodiment of the present disclosure.

FIG. 10 illustrates eNB validation in idle/inactive state using AS according to a third embodiment of the present disclosure.

Operations 1010, 1030, 1040, 1050, 1060, 1070, and 1090 of Embodiment 3 is same as operations 910C, 930C, 940C, 950C, 960C, 970C, and 990C in Embodiment 2 except that instead of temporary C-RNTI used in operations 920C and 980C, validation RNTI is assigned to UE in operations 1020 and 1080.

Validation RNTI may be released after 1080 in FIG. 10.

In this embodiment, validation response can also be sent using some predefined RNTI instead of validation RNTI. In RA response validation RNTI is not needed or signaled. In an alternate embodiment, UE can also include MAC in operation 1030 which can be verified by eNB after operation 1060. In alternate embodiment, instead of MSG3 and MSG4, validation Request and validation response can be used for SI on demand.

Embodiment 4

Figure 11:
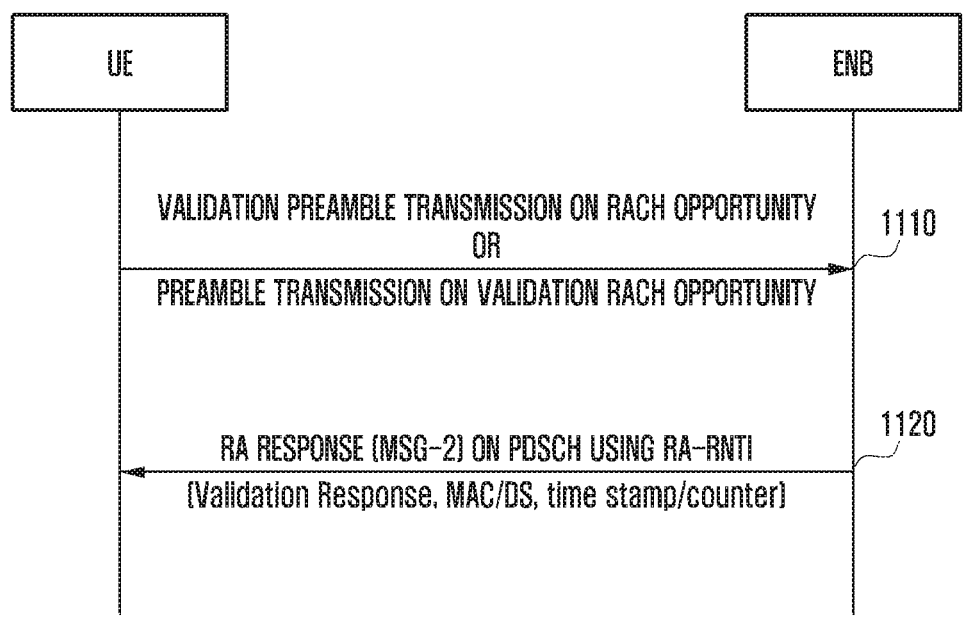
FIG. 11 illustrates eNB validation in idle/inactive state using AS according to a fourth embodiment of the present disclosure.

FIG. 11 illustrates eNB validation in idle/inactive state using AS according to a fourth embodiment of the present disclosure.

Operation 1110: In this embodiment, one or more preamble sequences can be reserved for eNB validation request. If the UE wants to transmit eNB validation request, it selects one preamble from preambles reserved for eNB validation request. Alternatively, PRACH opportunities are time multiplexed for normal RACH and eNB Validation request RACH. UE randomly selects one of the preamble sequences for transmission on the eNB validation request RACH opportunity.

Operation 1120: If eNB detects the preamble transmission on the PRACH from one or more UEs, it sends the RA response (RAR) on the PDSCH addressed by the PDCCH using RA-RNTI within the RA response window. The Msg2 may include at least one of validation response, MAC/DS and time stamp/time counter. ENB generates MAC/DS over validation response using the security key and time stamp/time counter as described in FIG. 1 and Proposed Method 1. UE validates the DS as in Proposed Method 1 and accordingly determines whether eNB is rogue or not.

Embodiment 5

Figure 12:
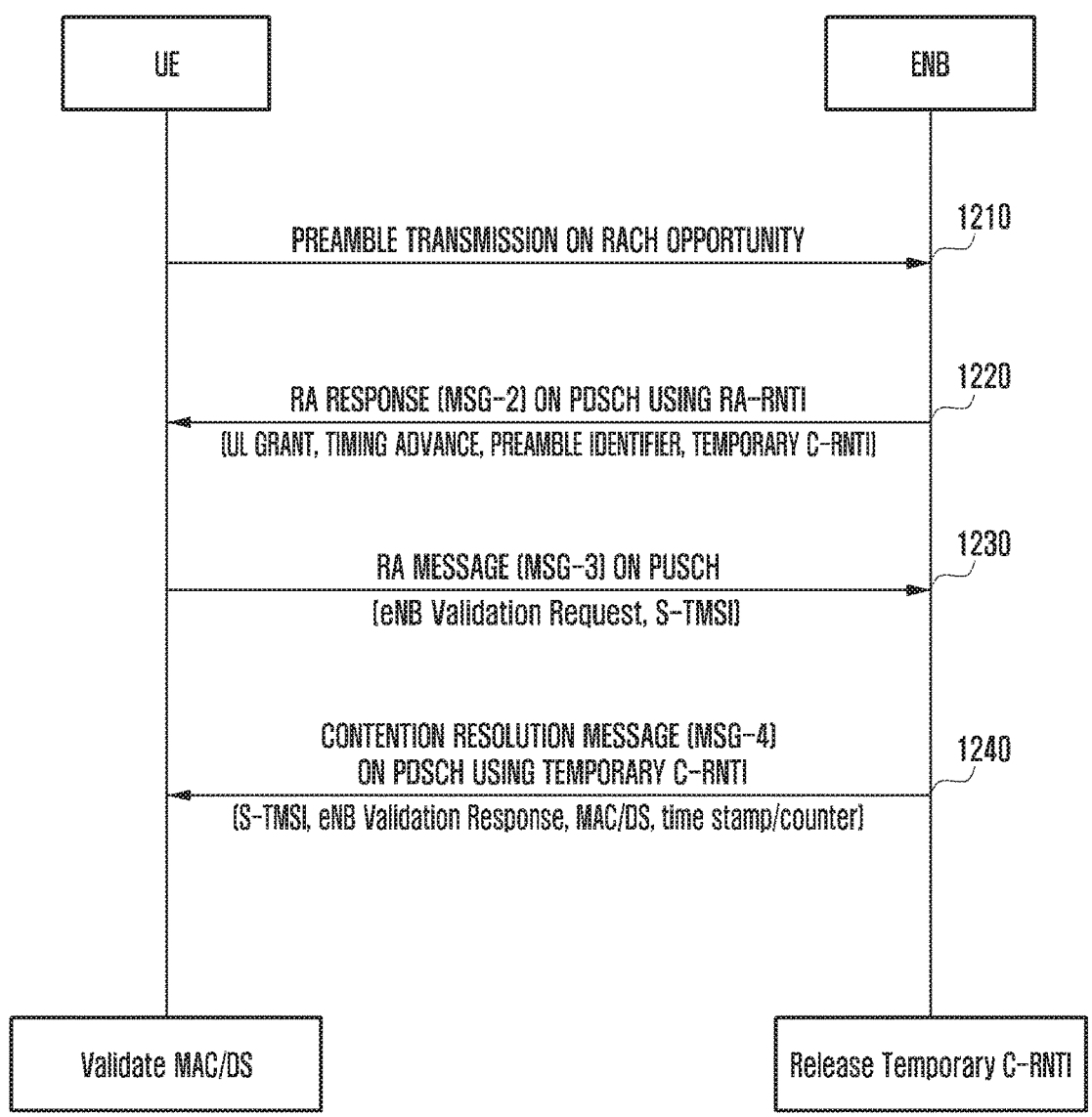
FIG. 12 illustrates eNB validation in idle/inactive state using AS according to a fifth embodiment of the present disclosure.

FIG. 12 illustrates eNB validation in idle/inactive state using AS according to a fifth embodiment of the present disclosure.

Referring to FIG. 12, UE randomly selects one preamble sequence from preamble sequences for transmission on the PRACH and transmits the selected preamble on the PRACH opportunity at operation 1210. The preamble sequences may be partitioned into multiple groups. If the preamble sequences are partitioned into multiple groups based on message size, UE selects the preamble from one of the groups depending on the size of the message it is expecting to be sent in RA message (Msg3).

If eNB detects the preamble transmission on the PRACH from one or more UEs, it sends the RA response (RAR) on the PDSCH addressed by the PDCCH using RA-RNTI within the RA response window at operation 1220. The RA response (Msg2) may include at least one of one or more RARs each including the initial UL grant, timing advance, RA preamble identifier (RAPID) and temporary C-RNTI for each detected preamble.

UEs for which the RAPID matches with the RA preamble sequence transmitted in operation 1210, transmits RA message (Msg3) on the PUSCH at the specified UL grant in Msg2 at operation 1230. Normally, Msg3 includes a RRC connection request, a tracking area update or a scheduling request. Also, HARQ is used for Msg3 transmission. In this embodiment, Msg3 is modified to indicate eNB validation request. Msg3 may include at least one of UE identity (e.g., S-TMSI) and eNB validation request.

ENB sends contention resolution message (Msg4) on the PDSCH addressed by the PDCCH using temporary C-RNTI at operation 1240. Msg4 may include at least one of the UE identity (e.g., S-TMSI) sent in Msg3, SI/eNB validation response, DS and time stamp/time counter. ENB generates DS over validation response using the security key and time stamp/time counter as described in FIG. 1 and Proposed Method 1. UE validates the DS as in Proposed Method 1 and accordingly determines whether eNB is rogue or not.

It is to be noted that in alternate embodiments BS/eNB can be 5G node B or transmission point or central node controlling various distributed/transmission points. It is to be noted that in alternate embodiments MME or AMF can be a control entity or entity performing security functions in core network. In case core network is sliced, this control entity or MME or AMF can be specific to network slice or common for all network slices or can belong to default network slice. Accordingly, network slice ID or control entity ID or service ID can be used in place of MME ID in these embodiments.

Proposed Method 4: eNB Validation in Idle/Inactive State Using NAS

In this method, UE checks if eNB is connected to authentic MME or core network to check if eNB is not rogue. Note that a rogue eNB cannot connect to an authentic MME/CN.

Embodiment 1

Figure 13:
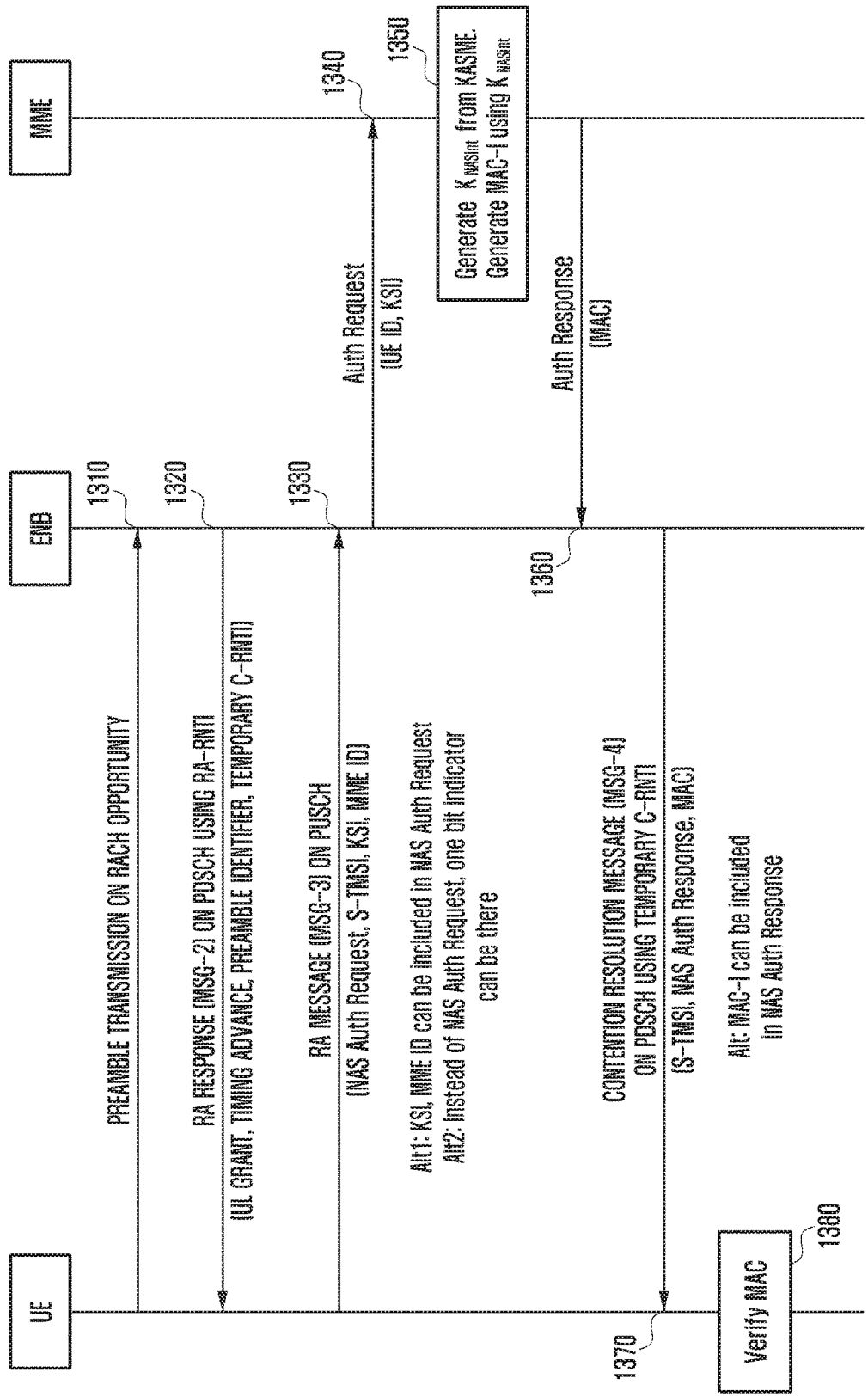
FIG. 13 illustrates eNB validation in idle/inactive state using non access stratum (NAS) according to a first embodiment of the present disclosure.

FIG. 13 illustrates eNB validation in idle/inactive state using NAS according to a first embodiment of the present disclosure.

Referring to FIG. 13, UE randomly selects one preamble sequence from preamble sequences for transmission on the PRACH and transmits the selected preamble on the PRACH opportunity at operation 1310. The preamble sequences may be partitioned into multiple groups. If the preamble sequences are partitioned into multiple groups based on message size, UE selects the preamble from one of the groups depending on the size of the message it is expecting to be sent in RA message (Msg3).

If eNB detects the preamble transmission on the PRACH from one or more UEs, it sends the RA response (RAR) on the PDSCH addressed by the PDCCH using RA-RNTI within the RA response window at operation 1320. The RA response (Msg2) may include at least one of one or more RARs each including the initial UL grant, timing advance, RA preamble identifier (RAPID) and temporary C-RNTI for each detected preamble.

UEs for which the RAPID matches with the RA preamble sequence transmitted in operation 1310, transmits RA message (Msg3) on the PUSCH at the specified UL grant in Msg2 at operation 1330. Normally, Msg3 includes a RRC connection request, a tracking area update or a scheduling request. In this embodiment, Msg3 is modified to indicate NAS authentication request. Msg3 may include at least one of UE identity (e.g., S-TMSI), NAS authentication request, KSI and MME ID. In one embodiment, KSI and MME ID can be included in NAS authentication request. In one embodiment, instead of NAS authentication request message, a one bit indicator can be there to indicate authentication request. With the transmission of Msg3, contention resolution timer is started. The value of the contention resolution timer can be set to higher value compared normal contention resolution timer to allow eNB time to execute operations 1340, 1350 and 1360.

ENB sends the key request to MME identified by MME ID received from UE at operation 1340. UE ID and KSI received from UE may be sent to MME in key request.

MME identifies the $K_{ASME}$ using the KSI and generates $K_{NASInt}$ or identifies the $K_{NASInt}$ directly from the KSI and the UE identity, as the MME maintains the NAS context when the UE is in RRC Idle, at operation 1350. MME generates authentication response and MAC for it.

MME sends authentication response with MAC to eNB at operation 1360.

ENB sends Contention resolution message (Msg4) on the PDSCH addressed by the PDCCH using temporary C-RNTI at operation 1370. Msg4 may include at least one of the UE identity (e.g., S-TMSI) sent in Msg3, Authentication response and MAC. In one embodiment, MAC can be included in authentication response message.

UE verifies MAC at operation 1380. Specifically, UE generates security key $K_{NASInt}$ for integrity verification from $K_{ASME}$. UE then generates MAC for authentication response (Auth-Response) using security key $K_{NASInt}$. If the generated MAC is same as MAC received from eNB, UE considers eNB as authentic.

In an alternate embodiment, in operation 1310, preamble or RACH opportunity can be reserved for authentication and UE uses the same.

Temporary C-RNTI may be released after operation 1370 in FIG. 13.

Embodiment 2

Figure 14:
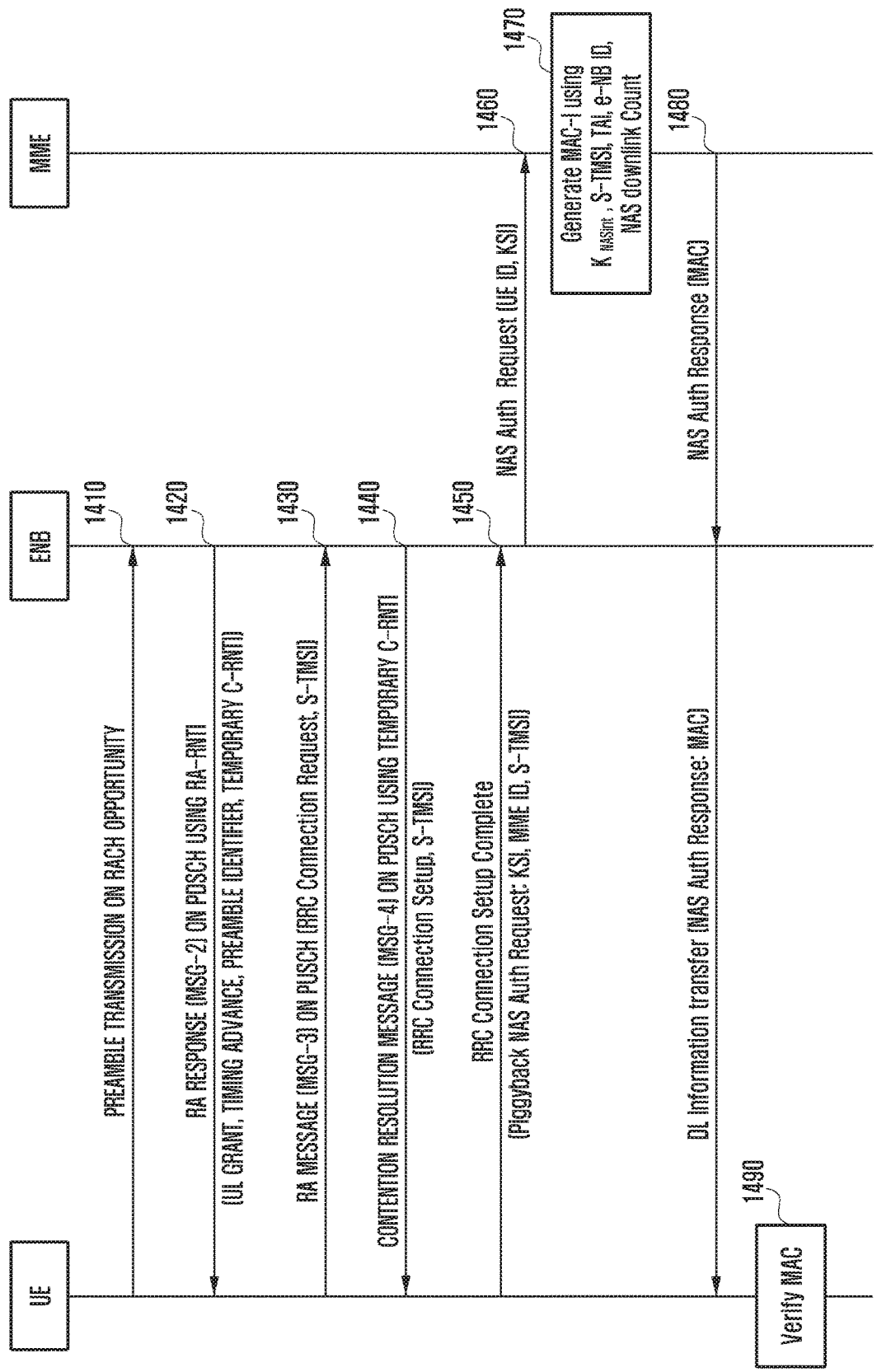
FIG. 14 illustrates eNB validation in idle/inactive state using NAS according to a second embodiment of the present disclosure.

FIG. 14 illustrates eNB validation in idle/inactive state using NAS according to a second embodiment of the present disclosure.

Referring to FIG. 14, UE randomly selects one preamble sequence from preamble sequences for transmission on the PRACH and transmits the selected preamble on the PRACH opportunity at operation 1410. The preamble sequences may be partitioned into multiple groups. If the preamble sequences are partitioned into multiple groups based on message size, UE selects the preamble from one of the groups depending on the size of the message it is expecting to be sent in RA message (Msg3).

If eNB detects the preamble transmission on the PRACH from one or more UEs, it sends the RA response (RAR) on the PDSCH addressed by the PDCCH using RA-RNTI within the RA response window at operation 1420. The RA response (Msg2) may include at least one of one or more RARs each including the initial UL grant, timing advance, RA preamble identifier (RAPID) and temporary C-RNTI for each detected preamble.

UEs for which the RAPID matches with the RA preamble sequence transmitted in operation 1410, transmits RA message (Msg3) on the PUSCH at the specified UL grant in Msg2 at operation 1430. Normally, Msg3 includes a RRC connection request, a tracking area update or a scheduling request.

ENB sends Contention resolution message (Msg4) on the PDSCH addressed by the PDCCH using temporary C-RNTI at operation 1440. Msg4 may include the UE identity (e.g., S-TMSI) sent in Msg3.

UE sends RRC connection setup complete message to the eNB operation 1450. This message may carry the UE identity (e.g., S-TMSI), NAS authentication request, KSI and MME ID. In one embodiment, KSI and MME ID can be included in NAS authentication request. In one embodiment, instead of NAS authentication request message, a one bit indicator can be there to indicate authentication request.

ENB sends the authentication request to MME identified by MME ID received from UE at operation 1460. UE ID and KSI received from UE may be sent to MME in key request.

MME identifies the $K_{ASME}$ using the KSI and generates $K_{NASInt}$ or identifies the $K_{NASInt}$ directly from the KSI and the UE identity at operation 1470. MME generates authentication response and MAC for it.

MME sends authentication response with MAC to eNB at operation 1480. The eNB then forwards the authentication response to the UE.

UE verifies MAC at operation 1490. Specifically, UE generates security key $K_{NASInt}$ (if it is not existing) for integrity verification from $K_{ASME}$. UE then generates MAC for authentication response (Auth-Response) using security key $K_{NASInt}$. If the generated MAC is same as MAC received from eNB, UE considers eNB as authentic.

Embodiment 3

Figure 15:
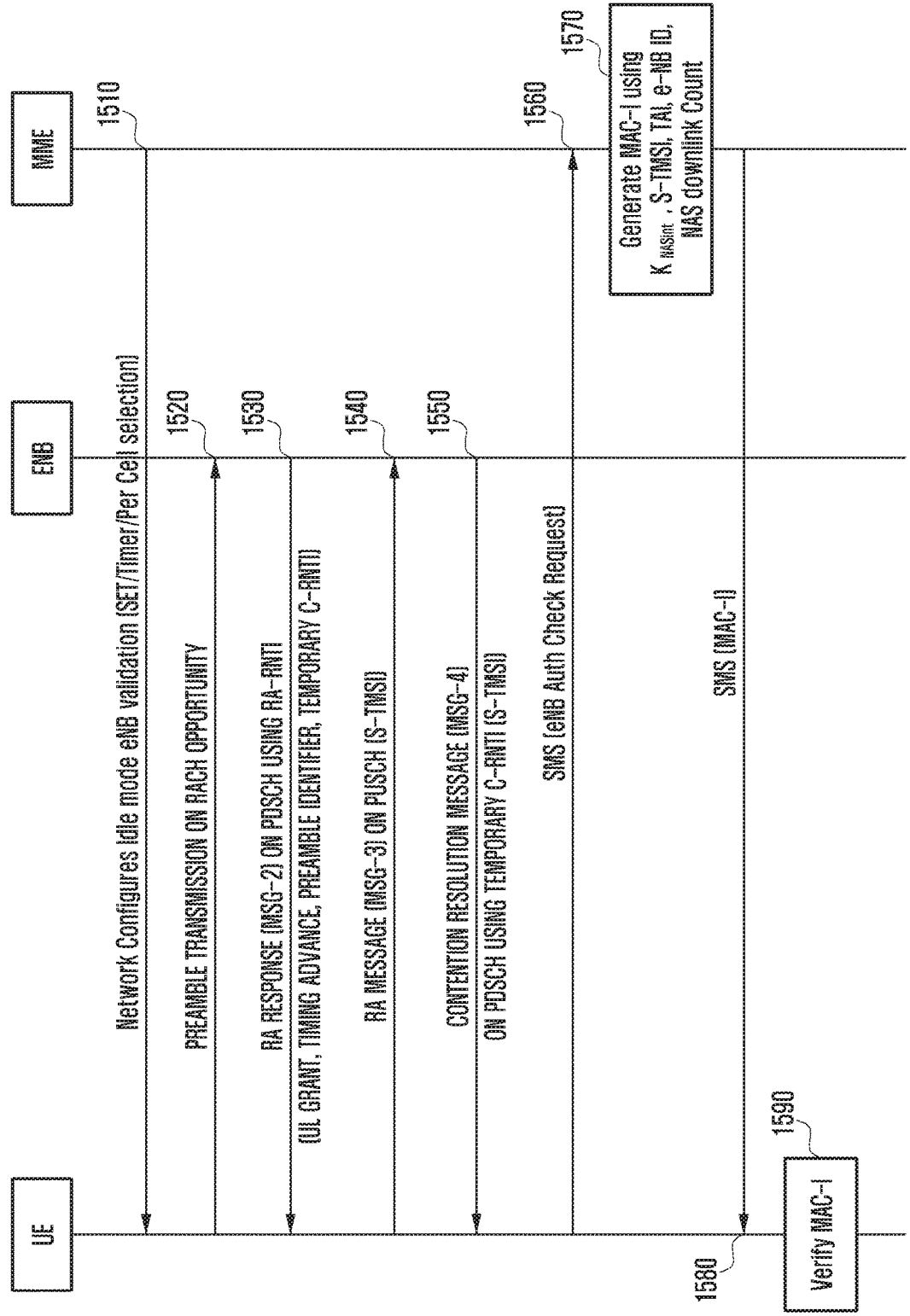
FIG. 15 illustrates eNB validation in idle/inactive state using NAS according to a third embodiment of the present disclosure.

FIG. 15 illustrates eNB validation in idle/inactive state using NAS according to a third embodiment of the present disclosure.

Referring to FIG. 15, based on the network policy and/or operators configuration and/or user's configuration, the network pre-configures in the UICC or dynamically configures in the UE for Idle mode eNB validation at operation 1510. The configuration may include the information on whether the Idle mode eNB validation to be performed or not and the frequency (whether the validation to be performed for every cell (re)selection and/or based on timer).

UE randomly selects one preamble sequence from preamble sequences for transmission on the PRACH and transmits the selected preamble on the PRACH opportunity at operation 1520. The preamble sequences may be partitioned into multiple groups. If the preamble sequences are partitioned into multiple groups based on message size, UE selects the preamble from one of the groups depending on the size of the message it is expecting to be sent in RA message (Msg3).

If eNB detects the preamble transmission on the PRACH from one or more UEs, it sends the RA response (RAR) on the PDSCH addressed by the PDCCH using RA-RNTI within the RA response window at operation 1530. The RA response (Msg2) may include at least one of one or more RARs each including the initial UL grant, timing advance, RA preamble identifier (RAPID) and temporary C-RNTI for each detected preamble.

UEs for which the RAPID matches with the RA preamble sequence transmitted in operation 1520, transmits RA message (Msg3) on the PUSCH at the specified UL grant in Msg2 at operation 1540. Normally, Msg3 includes a RRC connection request, a tracking area update or a scheduling request.

ENB sends Contention resolution message (Msg4) on the PDSCH addressed by the PDCCH using temporary C-RNTI at operation 1550. Msg4 may include the UE identity (e.g., S-TMSI) sent in Msg3.

The UE based on configuration, short message service (SMS) is sent to the network to perform Idle mode eNB validation at operation 1560. This SMS may carry the UE identity (e.g., S-TMSI), NAS authentication request, KSI and MME ID for eNB authenticity check. In one embodiment, KSI and MME ID can be included in NAS authentication request. In an embodiment, the instead of SMS, any NAS message is used.

MME identifies the $K_{ASME}$ using the KSI and generates $K_{NASInt}$ or identifies the $K_{NASInt}$ directly from the KSI and the UE identity at operation 1570. MME generates authentication response and MAC for it.

MME sends the response with MAC to the UE at operation 1580.

UE verifies MAC-I at operation 1590. Specifically, UE generates security key $K_{NASInt}$ (if it is not existing) for integrity verification from $K_{ASME}$. UE then generates MAC for authentication response (Auth-Response) using security key $K_{NASInt}$. If the generated MAC is same as MAC received from eNB, UE considers eNB as authentic.

Embodiment 4

Figure 16:
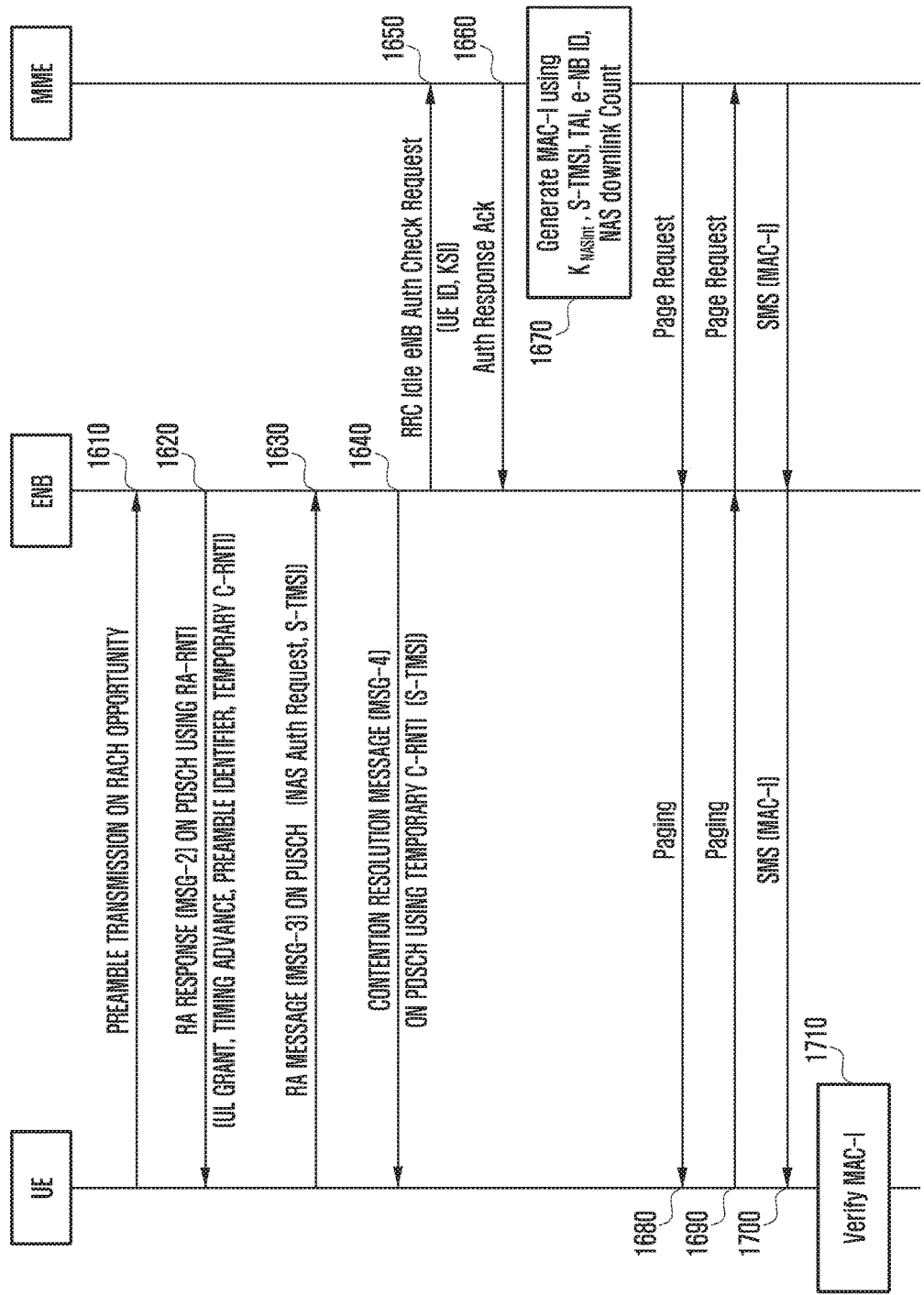
FIG. 16 illustrates eNB validation in idle/inactive state using NAS according to a fourth embodiment of the present disclosure.

FIG. 16 illustrates eNB validation in idle/inactive state using NAS according to a fourth embodiment of the present disclosure.

Referring to FIG. 16, UE randomly selects one preamble sequence from preamble sequences for transmission on the PRACH and transmits the selected preamble on the PRACH opportunity at operation 1610. The preamble sequences may be partitioned into multiple groups. If the preamble sequences are partitioned into multiple groups based on message size, UE selects the preamble from one of the groups depending on the size of the message it is expecting to be sent in RA message (Msg3).

If eNB detects the preamble transmission on the PRACH from one or more UEs, it sends the RA response (RAR) on the PDSCH addressed by the PDCCH using RA-RNTI within the RA response window at operation 1620. The RA response (Msg2) may include at least one of one or more RARs each including the initial UL grant, timing advance, RA preamble identifier (RAPID) and temporary C-RNTI for each detected preamble.

UEs for which the RAPID matches with the RA preamble sequence transmitted in 1610, transmits RA message (Msg3) on the PUSCH at the specified UL grant in Msg2 at operation 1630. Normally, Msg3 includes a RRC connection request, a tracking area update or a scheduling request. In this embodiment, Msg3 is modified to indicate NAS authentication request. Msg3 may include at least one of UE identity (e.g., S-TMSI), NAS authentication request, KSI and MME ID. In one embodiment, KSI and MME ID can be included in NAS authentication request. In one embodiment, instead of NAS authentication request message, a one bit indicator can be there to indicate authentication request.

ENB sends Contention resolution message (Msg4) on the PDSCH addressed by the PDCCH using temporary C-RNTI at operation 1640. Msg4 may include the UE identity (e.g., S-TMSI) sent in Msg3.

The eNB based on request to perform Idle mode eNB validation, in Msg 3, sends the key request (i.e., RRC Idle eNB authentication check request) to MME identified by MME ID received from UE at operation 1650. UE ID and KSI received from UE may be sent to MME in key request.

MME acknowledges the key request, i.e., sends authentication response acknowledge, to the eNB in a response message at operation 1660.

MME identifies the $K_{ASME}$ using the KSI and generates $K_{NASInt}$ or identifies the $K_{NASInt}$ directly from the KSI and the UE identity at operation 1670. MME generates authentication response and MAC. The MAC is generated at least using one of: $K_{NASInt}$, S-TMSI, TAI, e-NB ID, NAS downlink Count.

As the UE is in RRC idle mode, the MME initiates paging to push the MAC to the UE to validate the eNB at operation 1680.

In response to paging request, the UE moves to RRC connected and send paging response to the MME at operation 1690.

The MME sends the MAC to the UE to verify the eNB at operation 1700.

UE verifies MAC-I at operation 1710. Specifically, UE generates security key $K_{NASInt}$ (if it is not existing) for integrity verification from $K_{ASME}$. UE then generates MAC for Auth-Response using security key $K_{NASInt}$. If the generated MAC is same as MAC received from eNB, UE considers eNB as authentic.

It is to be noted that in alternate embodiments BS/eNB can be 5G node B or transmission point or central node controlling various distributed/transmission points. It is to be noted that in alternate embodiments MME or AMF can be a control entity or entity performing security functions in core network. In case core network is sliced, this control entity or MME or AMF can be specific to network slice or common for all network slices or can belong to default network slice. Accordingly, network slice ID or control entity ID or service ID can be used in place of MME ID in these embodiments.

In the Proposed Methods 2, 3 and 4, described above UE can verify that BS is authentic based on MAC validation. However, if UE does not receive any response, then UE cannot validate MAC. A Rogue BS may not respond to UE's validation/authentication request. A rule is needed for UE to determine whether BS is rogue or not when validation response is not received.

UE can try for some fixed number of times and if it does not receive response and if radio link quality is good (i.e., UE can continue to remain on the camped cell based on link quality), then UE can consider the BS or cell as rogue and should reselect another cell.

In all methods described above, whether cell/BS validation/authentication request from UE is supported or not can be signaled via NAS signaling.

Proposed Method 5: On Demand SI or eNB Validation in Idle State Using AS:

5G SI is divided into minimum SI and other SI. The other SI may be broadcast, provided in a dedicated manner by the gNB or triggered either by the network or upon request from the UE. The authenticity verification information can be classified into the other SI.

Figure 17:
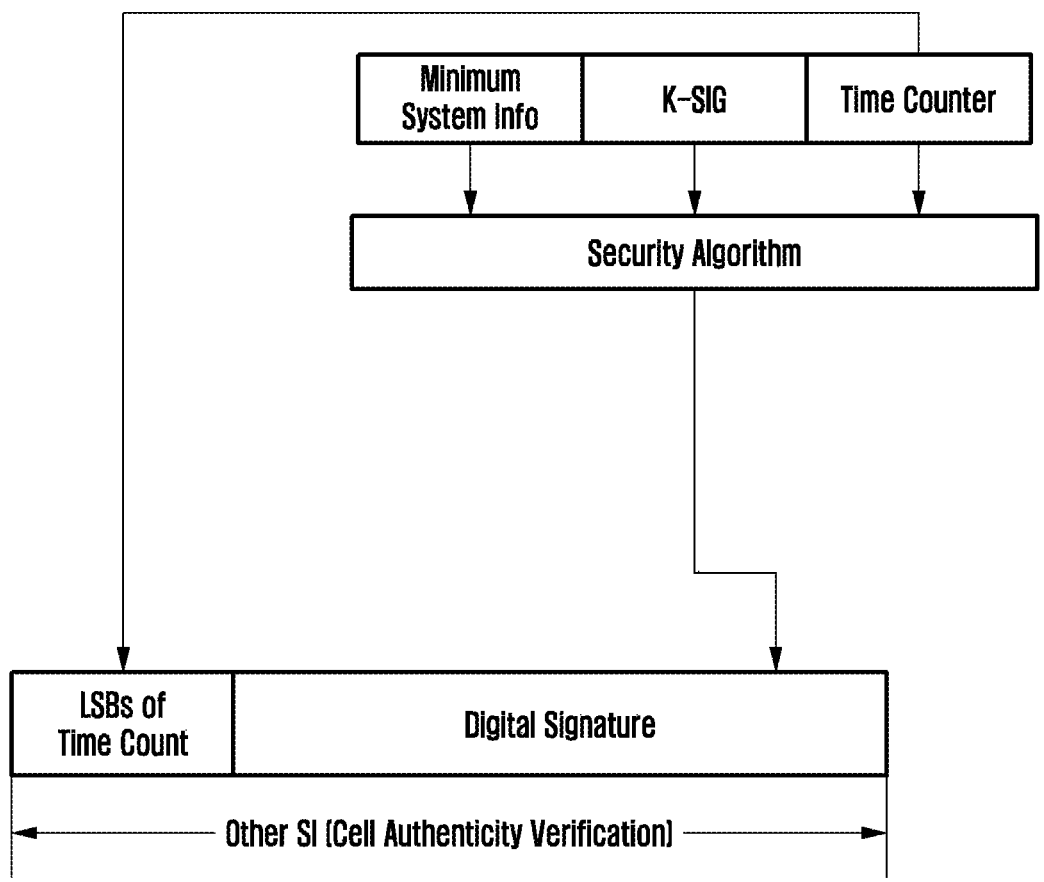
FIG. 17 illustrates cell authenticity verification using other SI according to an embodiment of the present disclosure.
Figure 18A:
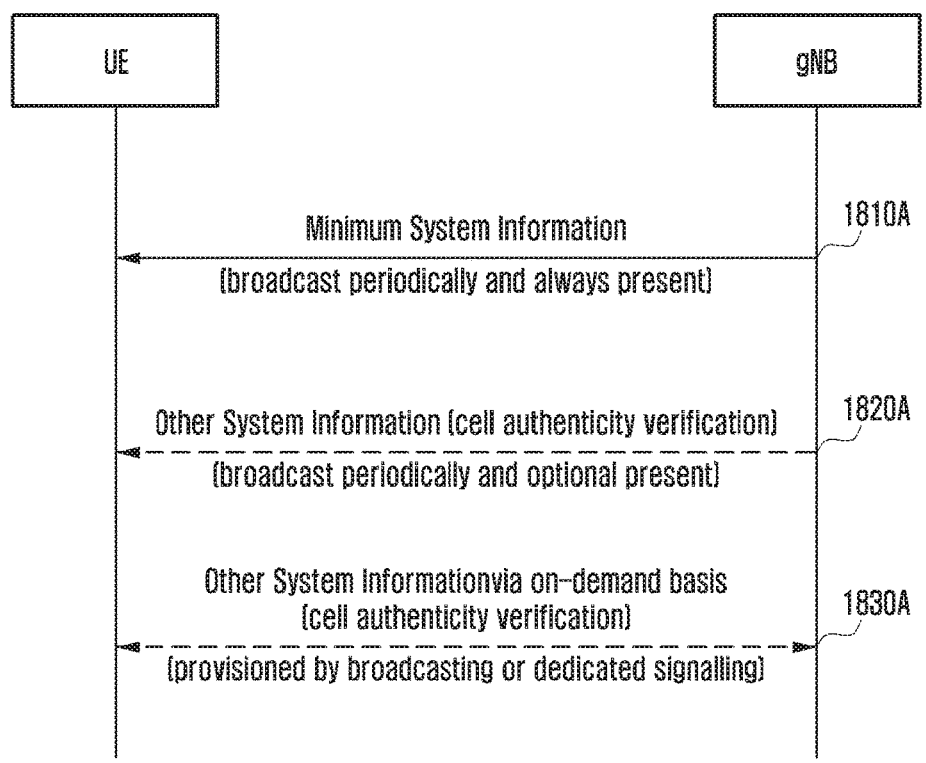
FIG. 18A illustrates transmission of cell authenticity verification using other SI according to an embodiment of the present disclosure.

FIG. 17 illustrates cell authenticity verification using other SI according to an embodiment of the present disclosure. FIG. 18A illustrates transmission of cell authenticity verification using other SI according to an embodiment of the present disclosure.

As shown in FIG. 17, the gNB generates the authenticity verification information, i.e., DS with the minimum SI (e.g., MIB or SIB 1) broadcasted, private security key (K-SIG$_{Private}$) and time stamp/time Counter as input. As shown in FIG. 18A, the gNB provides the DS in the other SI (as a separate SI or along with the requested SI (e.g., V2V SI)) either periodically or upon request from the UE at operation 1820A.

If the time stamp is used, then time stamp comprises at least one of Year, Month, Date, Hour, Minute, Second (mille second or micro second) and Time Zone corresponding to time slot (e.g., TTI, subframe, slot, mini slot etc.) in which SI will be transmitted. If the time counter is used, then time counter can be UTC time (in unit of secs or minutes or any other unit) corresponding to time slot in which SI (or signaling message carrying SI) will be transmitted. Additional parameters such as FC, flow ID or radio bearer ID, length, SN, etc. may also be input to security algorithm to generate MAC or DS.

The time stamp/time counter used for generation of DS may correspond to the time slot in which DS is transmitted by gNB and received by UE, respectively. Alternately, the time stamp/time counter used for generation of DS may correspond to the time slot in which minimum SI (e.g., MIB or SIB 1) is transmitted by gNB and received by UE, respectively. Alternately, multiple time stamp/time counters (i.e., time stamp/time counter corresponding to the time slot in which minimum SI (e.g., MIB or SIB 1) is transmitted by gNB and received by UE, respectively, and time stamp/time counter corresponding to the time slot in which DS is transmitted by gNB and received by UE, respectively) can be used for generation of DS.

In one embodiment, time stamp/time counter value used to generate MAC or DS can also be transmitted along with MAC or DS. In another embodiment, instead of full time stamp/time counter, some LSBs of time stamp/time counter value used to generate MAC or DS can be transmitted along with MAC or DS.

From UE point of view, in one embodiment wherein full time stamp/time counter is transmitted by the transmitter, the time stamp/time counter corresponding to the time slot in which minimum SI and/or time slot in which DS is received has the time stamp/time counter value received from transmitter.

From UE point of view, in another embodiment wherein partial time stamp/time counter is transmitted by the transmitter, the time stamp/time counter corresponding to the time slot in which minimum SI and/or time slot in which DS is received is determined using the time stamp/time counter maintained by UE and partial time stamp/time counter value received from transmitter. In one method in which 'x' LSBs of time stamp/time counter are received from transmitter, receiver replaces the 'x' LSBs of time stamp/time counter at the receiver corresponding to the time slot in which minimum SI and/or time slot in which DS is received, by the 'x' LSBs of time stamp/time counter received. Alternately, the time stamp/time counter value with 'x' LSBs equal to 'x' LSBs received from the transmitter and nearest to the time stamp/time counter value in the receiving UE corresponding to the time slot in which minimum SI and/or time slot in which DS is received is used as the time stamp/time counter value of time slot in which minimum SI and/or time slot in which DS is received.

In another embodiment, wherein time stamp/time counter is not transmitted by the transmitter, the time stamp/time counter corresponding to the time slot in which minimum SI and/or time slot in which DS is received is equal to the time stamp/time counter value in the receiver corresponding to the time slot.

If the full time stamp/time counter is received from the transmitter and if difference between received timestamp/time counter and time stamp/counter in UE for time slot in which minimum SI and/or time slot in which DS is received is above a threshold (threshold can be pre-defined or signaled to UE by the network), UE considers the SI as not authentic. If the partial time stamp/time counter is received from the transmitter and if difference between determined timestamp/time counter as described above and time stamp/counter in UE for time slot in which minimum SI and/or time slot in which DS is received is above a threshold, UE considers the SI as not authentic.

In an embodiment, as the UE needs to verify the authenticity of the gNB, only signing of the minimum SI is performed in order to reduce the overhead in the UE and in the gNB.

Figure 18B:
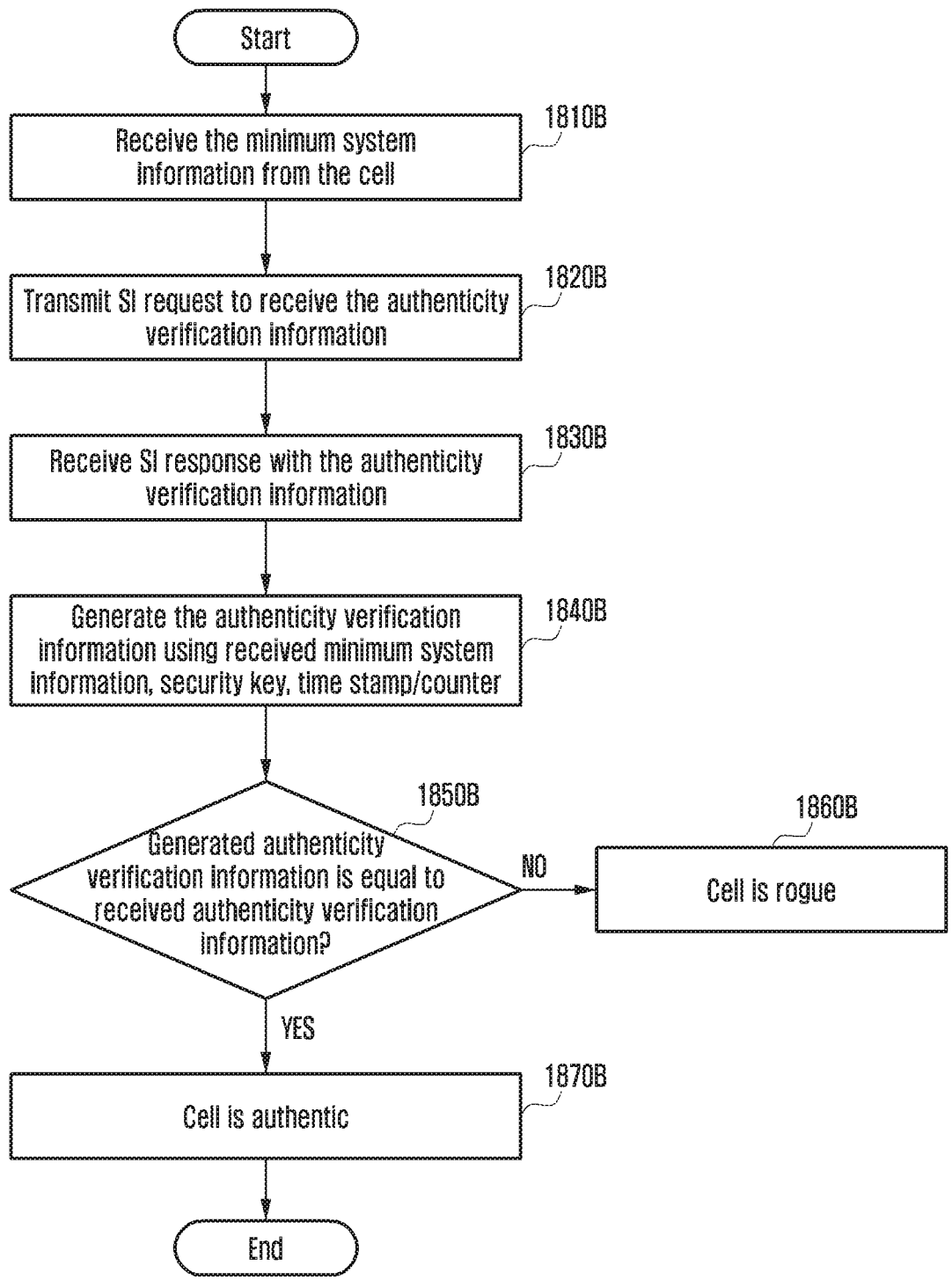
FIG. 18B illustrate the UE operation of validating the authenticity of cell according to an embodiment of the present disclosure.

FIG. 18B illustrate the UE operation of validating the authenticity of cell according to an embodiment of the present disclosure.

Referring to FIG. 18B, the UE receives the minimum SI from the cell at operation 1810B.

The UE transmits SI request to receive the authenticity verification information at operation 1820B.

The UE receives SI response with the authenticity verification information at operation 1830B.

The UE generates the authenticity verification information using at least one of received minimum SI, security key and time stamp/counter at operation 1840B.

The UE determines whether generated authenticity verification information is equal to received authenticity verification information at operation 1850B.

The UE determines that cell is rogue if the generated authenticity verification information is not equal to the received authenticity verification information at operation 1860B.

The UE determines that cell is authentic if the generated authenticity verification information is equal to the received authenticity verification information at operation 1870B.

Key Provisioning for DS generation and verification:

In an embodiment, K-SIG$_{Private}$ is specific to the Tracking area. If there is a gNB or more than one gNB within the TA, the same K-SIG$_{Private}$ is used by the gNB(s) for signing the SI. The same is applicable for split of protocol stack over the 5G new radio (NR) radio interface also. The gNB are pre-provisioned with the private key (K-SIG$_{Private}$) by the operator during installation or by the OAM entity managing the gNB. The private key (K-SIG$_{Private}$) is provisioned in the gNB/eNB by the mobile network operation (MNO).

Figure 19:
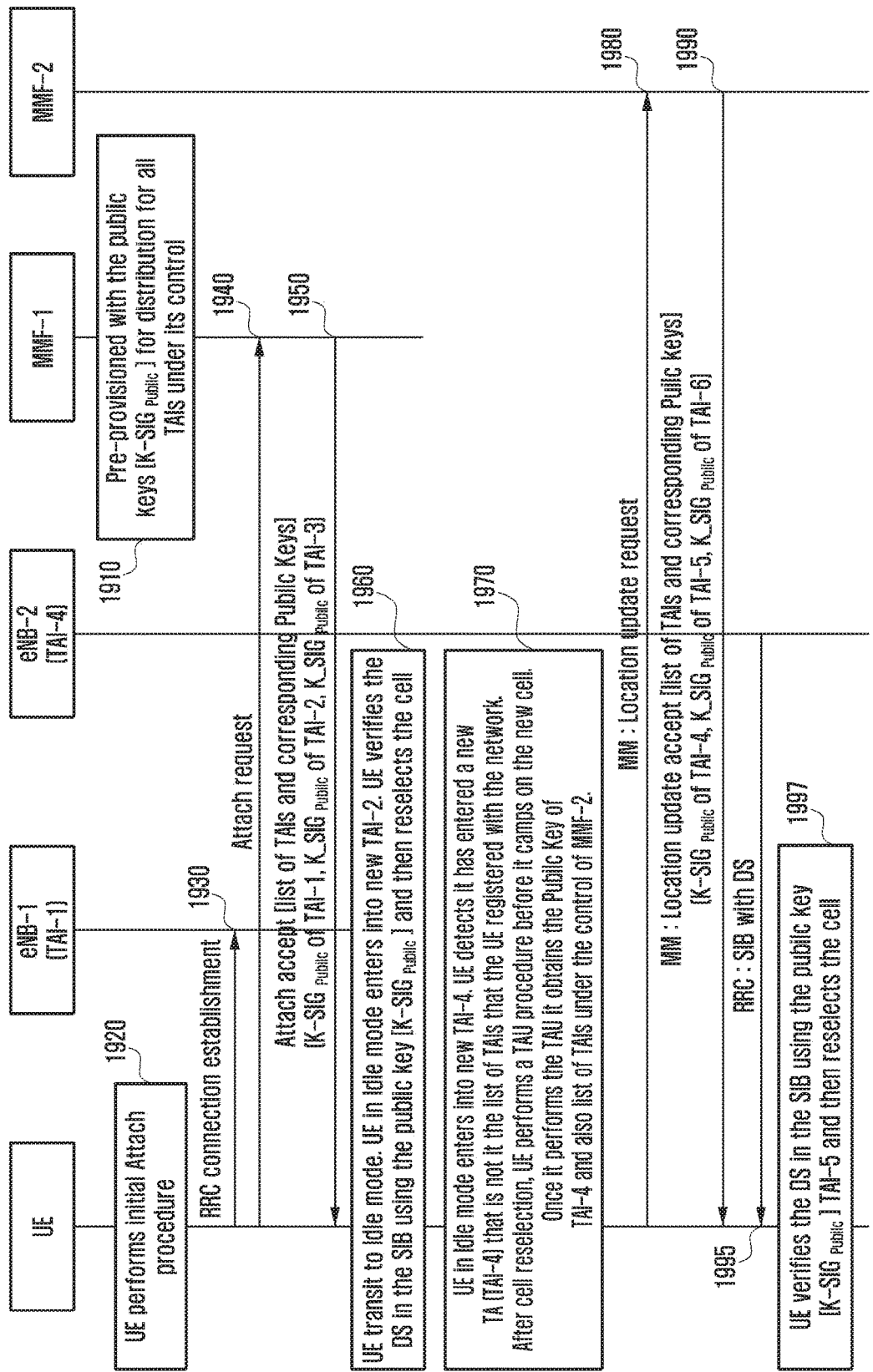
FIG. 19 illustrates provisioning of public keys to the UE according to an embodiment of the present disclosure.

FIG. 19 illustrates provisioning of Public Keys to the UE according to an embodiment of the present disclosure. The public K-SIG$_{Public}$ key is provisioned by the core network to the UE, when performing location update procedure at operation 1990, as shown in FIG. 19. The MME/AMF/mobile management function (MMF) in the core network provides the list of TAIs along with the public key to the UE when the UE performing Attach Procedure or tracking area update (TAU) or registration procedure (5G system NAS procedure).

Specifically, referring to FIG. 19, MMF-1 is pro-provisioned with the public keys (K-SIG$_{Public}$) for distribution for all TAIs under its control operation 1910.

UE performs initial attach procedure at operation 1920.

UE sends an RRC connection establishment message to eNB-1 at operation 1930.

UE sends an attach request message to MMF-1 at operation 1940.

MMF-1 sends an attach accept message including list of TAIs and corresponding public keys to UE at operation 1950.

At operation 1960, UE transits to idle mode at operation. UE in idle mode enters into new TAI-2. UE verifies the DS in the SIB using the public key (K-SIG$_{Public}$) and then reselects the cell.

At operation 1970, UE in idle mode enters into new TAI-4. UE detects it has entered a new TA (TAI-4) that is not in the list of TAIs that the UE registered with the network. After cell reselection, UE performs a TAU procedure before it camps on the new cell. Once it performs the TAU, it obtains the public key of TAI-4 and also list of TAIs under the control of MMF-2.

UE sends a location update request message to MMF-2 at operation 1980.

MMF-2 sends a location update accept message including list of TAIs and corresponding public keys (e.g., K-SIG$_{Public}$ of TAI-4, K-SIG$_{Public}$ of TAI-5, K-SIG$_{Public}$ of TAI-6) to operation 1990.

ENB-2 sends a SIB with DS at operation 1995.

UE verifies the DS in the SIB using the public key (K-SIG$_{Public}$) TAI-5 and then reselects the cell at operation 1997.

In an embodiment, K-SIG$_{Private}$ specific to the Tracking area is provided by the MME/AMF/MMF to the eNB/gNB using the S1-AP message over the S1 or N2 interface. In an embodiment, the eNB/gNB requests the MME/MMF/AMF for the private key in a dedicated message. In another embodiment, the MME/MMF/AMF provides the private key to the eNB/gNB when responding to the UE's NAS procedure based on timestamp or periodically.

Proposed Method 6: SI Verification Using Identity Based Cryptography:

The network provisions UEs and NR with a set of credentials for elliptic curve-based certificate less signatures for identity-based encryption (ECCSI), as defined in IETF RFC 6507 [33] along with the public key of the CN. Furthermore, UEs are provisioned with the public validation token (PVT) specific to each cell and the NR are configured with the secret signing key (SSK) associated with its cell identity. In order to verify the authenticity of the cell, the NR act as "signer" and the UE act as the "verifier" (according to the definitions in RFC 6507). The NR uses SSK associated to the cell to sign the SI, and the UE uses the public key of the CN and the cell ID specific PVT to verify the signature.

Figure 20:
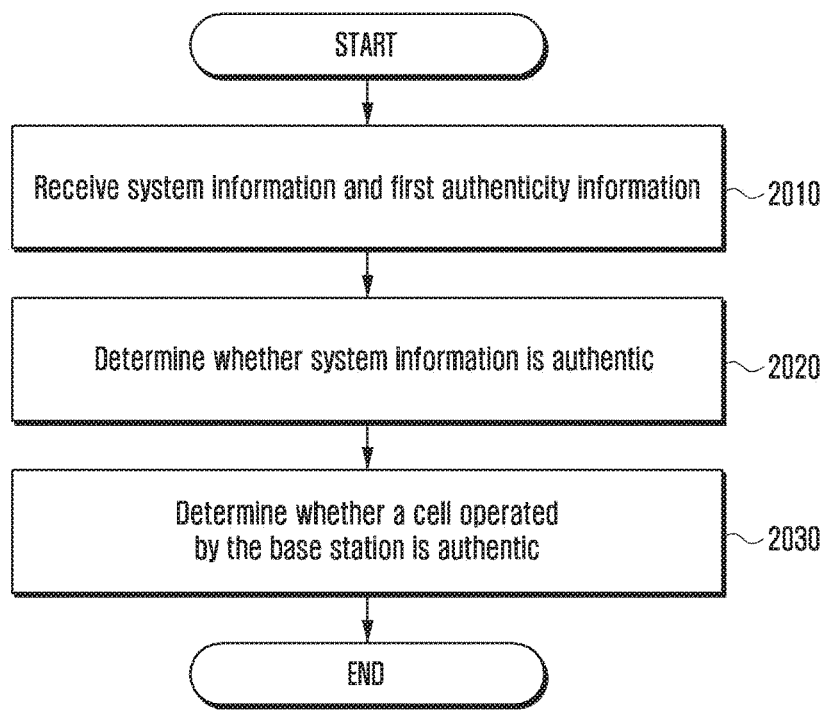
FIG. 20 illustrates a method of a UE for determining authenticity of system information received from a base station and a cell operated by the base station according to an embodiment of the present disclosure.

FIG. 20 illustrates a method of a UE for determining authenticity of system information received from a base station and a cell operated by the base station according to an embodiment of the present disclosure. The operations in FIG. 20 may correspond to a UE's operations in Proposed Methods 1 to 5 described above.

Referring to FIG. 20, the UE receives, from a base station, system information and first authenticity information associated with the system information at operation 2010. The first authenticity information may refer to MAC/DS described above. The first authenticity information can be received together with the system information or independently of the system information. Furthermore, the first authenticity information can be generated for multiple system information. In addition, the UE may also receive, from the base station, time information associated with the system information.

The UE determines whether the system information is authentic based on the first authenticity information at operation 2020. For example, the UE may derive second authenticity information from the system information and a security key and compare the second authenticity information with the first authenticity information. If the second authenticity information is same as the first authenticity information, the UE determines that the system information is authentic. If the second authenticity information is not same as the first authenticity information, the UE determines that the system information is rogue. The security key may be specific to PLMN, a cell, tracking area or eNB or RAN area or SI area. If the security key is specific to a cell, the security key may be derived from another PLMN specific security key. In addition, the UE may also use the time information associated with the system information for the authenticating system information.

At operation 2030, the UE determines whether a cell operated by the base station is authentic based on the determination of operation 2020. The UE may determine that if the system information authentic, the cell also authentic. The UE may determine that if the system information is not authentic, the cell is rogue. Alternatively, if the system information is not authentic, the UE initiates a network authentication to determine whether the cell is authentic.

Figure 21:
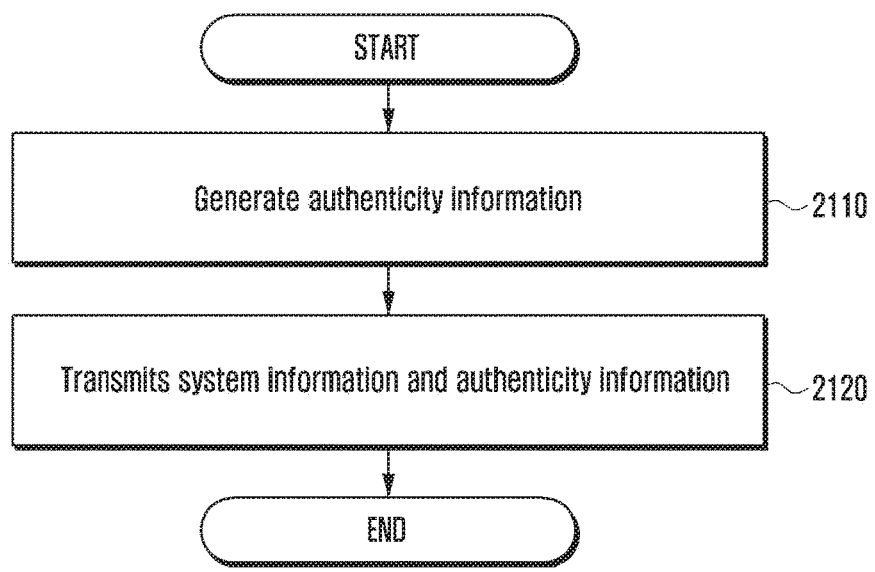
FIG. 21 illustrates a method of a base station for transmitting system information according to an embodiment of the present disclosure.

FIG. 21 illustrates a method of a base station for transmitting system information according to an embodiment of the present disclosure. The operations in FIG. 21 may correspond to an eNB's operations in Proposed Methods 1 to 5 described above.

Referring to FIG. 21, a base station generates authenticity information for associating system information at operation 2110. The base station may generate the authenticity information based on the system information and a security key. The security key may be specific to PLMN, a cell, tracking area or eNB or RAN area or SI area. If the security key is specific to a cell, the security key may be derived from another PLMN specific security key.

The base station transmits, to a user equipment, the system information and the authenticity information at operation 2120. The base station may transmit the authenticity information together with the system information or independently of the system information. In addition, the base station may also transmit, to the user equipment, time information associated with the system information. The system information is transmitted based on the time information.

Figure 22:
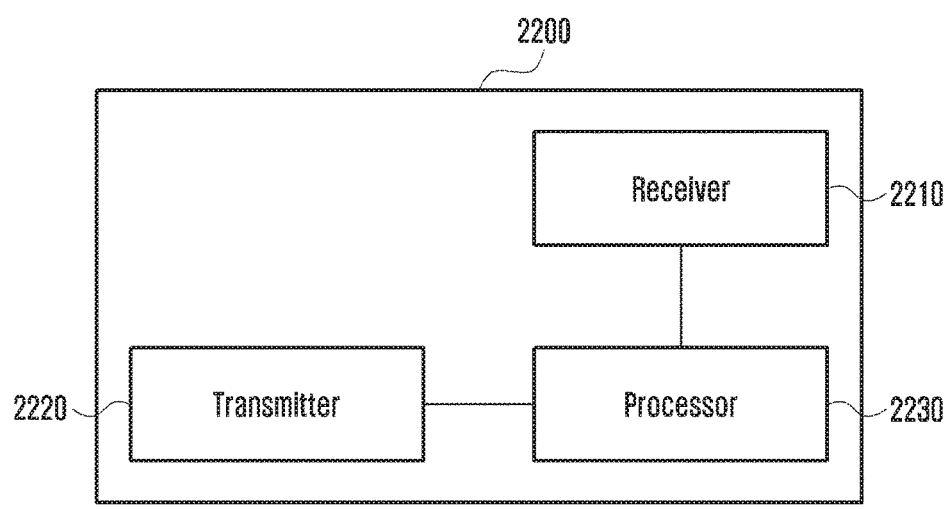
FIG. 22 is a block diagram of a UE in a wireless communication system according to an embodiment of the present disclosure.

FIG. 22 is a block diagram of a UE in a wireless communication system according to an embodiment of the present disclosure.

Referring to FIG. 22, the UE (2200) includes a receiver (2210), a transmitter (2220) and a processor (2230). The receiver (2210), the transmitter (2220) and the processor (2230) are configured to perform the operations in Proposed Methods 1 to 5, and the steps of the method illustrated in FIG. 20. Specifically, the receiver (2210) is configured to receive, from a base station, system information, and receive, from the base station, first authenticity information associated with the system information. The processor (2230) is configured to determine whether the system information is authentic based on the first authenticity information, and determine that a cell operated by the base station is authentic if the system information is authentic. The processor (2230) may be configured to determine that the cell is rogue and/or to initiate a network authentication to determine whether the cell is authentic if the system information is not authentic. Furthermore, the receiver (2210) may be configured to receive, from the base station, time information associated with the system information, and the processor (2230) may be configured determine whether the system information is authentic based on the time information. In addition, the processor (2230) may be configured to determine whether the system information is authentic by deriving second authenticity information from the system information and a security key, comparing the second authenticity information with the first authenticity information, and if the second authenticity information is same as the first authenticity information, determining that the system information is authentic.

Figure 23:
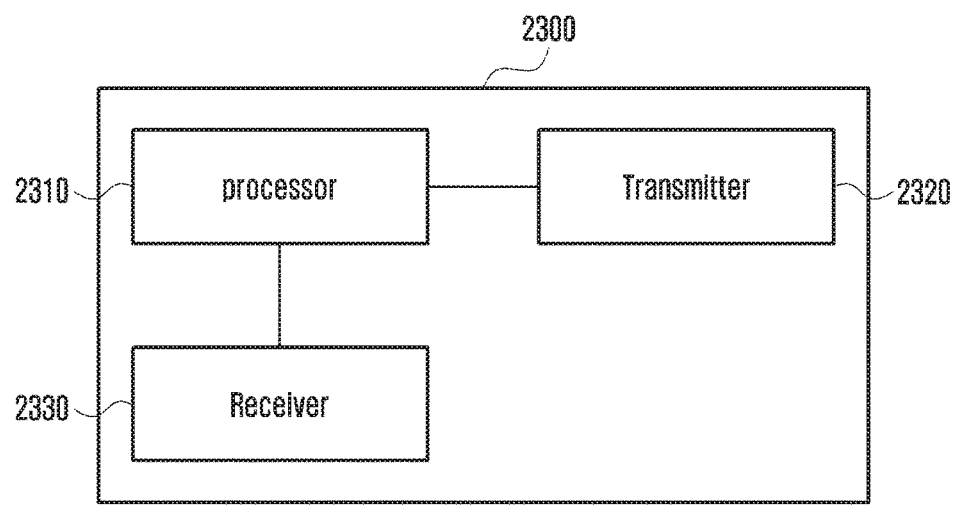
FIG. 23 is a block diagram of a base station in a wireless communication system according to an embodiment of the present disclosure.

FIG. 23 is a block diagram of a base station in a wireless communication system according to an embodiment of the present disclosure.

Referring to FIG. 23, the base station (2300) includes a processor (2310), a transmitter (2320) and a receiver (2330). The processor (2310), the transmitter (2320) and the receiver (2330) are configured to perform the operations in Proposed Methods 1 to 5, and the steps of the method illustrated in FIG. 21. Specifically, the processor (2310) is configured to generate authenticity information associated with system information. The transmitter (2320) is configured to transmit, to a user equipment, the system information, and transmit, to the user equipment, the authenticity information. The transmitter (2320) may be configured to transmit, to the user equipment, time information associated with the system information. Furthermore, the transmitter (2320) may be configured to transmit the system information based on the time information. In addition, the processor (2310) may be configured to generate the authenticity information based on the system information and a security key.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a user equipment for determining authenticity of system information received from a base station and a cell operated by the base station, the method comprising:
receiving, from a base station, first system information;
receiving, from the base station, first authenticity information associated with the first system information;
deriving, by the user equipment, second authenticity information based on the first system information and a security key;
comparing the second authenticity information with the first authenticity information;
determining that the first system information is authentic if the second authenticity information is same as the first authenticity information; and
determining that a cell is authentic if the first system information is authentic, wherein the cell is operated by the base station and the first system information is received on the cell,
wherein the security key is specific to a cell, and
wherein the security key is derived from a public land mobile network (PLMN) specific security key.

2. The method of claim 1, further comprising:
determining that the cell is rogue if the first system information is not authentic.

3. The method of claim 1, further comprising:
initiating a network authentication to determine whether the cell is authentic if the first system information is not authentic.

4. The method of claim 1, further comprising:
receiving, from the base station, time information associated with the first system information; and
determining whether the first system information is authentic based on the time information.

5. The method of claim 1, wherein the first authenticity information includes a message authentication code (MAC) of the first system information.

6. The method of claim 1, further comprising:
transmitting, to the base station, a request to receive second system information,
wherein the first authenticity information is received in the second system information in response to the request.

7. A method of a base station for transmitting system information, the method comprising:
generating authenticity information associated with first system information based on the first system information and a security key;
transmitting, to a user equipment, the first system information; and
transmitting, to the user equipment, the authenticity information,
wherein the security key is specific to a cell, and
wherein the security key is derived from a public land mobile network (PLMN) specific security key.

8. The method of claim 7, further comprising:
transmitting, to the user equipment, time information associated with the first system information,
wherein the first system information is transmitted based on the time information.

9. The method of claim 7, wherein the authenticity information includes a message authentication code (MAC) of the first system information.

10. The method of claim 7, further comprising:
receiving, from the user equipment, a request to receive second system information, and
wherein the authenticity information is transmitted in the second system information in response to the request.

11. A user equipment in a wireless communication system, the user equipment comprising:
a receiver configured to:
receive, from a base station, first system information, and
receive, from the base station, first authenticity information associated with the first system information; and
a processor configured to:
derive second authenticity information based on the first system information and a security key,
compare the second authenticity information with the first authenticity information,
determine that the first system information is authentic if the second authenticity information is same as the first authenticity information, and
determine that a cell is authentic if the first system information is authentic, wherein the cell is operated by the base station and the first system information is received on the cell,
wherein the security key is specific to a cell, and
wherein the security key is derived from a public land mobile network (PLMN) specific security key.

12. The user equipment of claim 11, wherein the processor is further configured to determine that the cell is rogue if the first system information is not authentic.

13. The user equipment of claim 11, wherein the processor is further configured to initiate a network authentication to determine whether the cell is authentic if the first system information is not authentic.

14. The user equipment of claim 11,
wherein the receiver is further configured to receive, from the base station, time information associated with the first system information, and
wherein the processor is further configured to determine whether the first system information is authentic based on the time information.

15. The user equipment of claim 11, wherein the first authenticity information includes a message authentication code (MAC) of the first system information.

16. The user equipment of claim 11, further comprising:
a transmitter configured to transmit, to the base station, a request to receive second system information,
wherein the first authenticity information is received in the second system information in response to the request.

17. A base station in a wireless communication system, the base station comprising:
a processor configured to generate authenticity information associated with first system information based on the first system information and a security key; and
a transmitter configured to:
transmit, to a user equipment, the first system information, and
transmit, to the user equipment, the authenticity information,
wherein the security key is specific to a cell, and
wherein the security key is derived from a public land mobile network (PLMN) specific security key.

18. The base station of claim 17,
wherein the transmitter is further configured to transmit, to the user equipment, time information associated with the first system information, and
wherein the transmitter is further configured to transmit the first system information based on the time information.

19. The base station of claim 17, wherein the authenticity information includes a message authentication code (MAC) of the first system information.

20. The base station of claim 17, further comprising:
a receiver configured to receive, from the user equipment, a request to receive second system information, and
wherein the transmitter is configured to transmit the authenticity information in the second system information in response to the request.

* * * * *